United States Patent
Gage

(10) Patent No.: US 11,197,254 B2
(45) Date of Patent: Dec. 7, 2021

(54) METHOD AND APPARATUS FOR TIME SYNCHRONIZED HANDOVER

(71) Applicant: William Anthony Gage, Stittsville (CA)

(72) Inventor: William Anthony Gage, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 16/664,442

(22) Filed: Oct. 25, 2019

(65) Prior Publication Data

US 2020/0145940 A1 May 7, 2020

Related U.S. Application Data

(60) Provisional application No. 62/754,109, filed on Nov. 1, 2018.

(51) Int. Cl.
*H04W 56/00* (2009.01)
*H04W 36/04* (2009.01)
(Continued)

(52) U.S. Cl.
CPC ..... *H04W 56/001* (2013.01); *H04W 36/0055* (2013.01); *H04W 36/04* (2013.01); *H04W 36/30* (2013.01); *H04W 72/042* (2013.01); *H04W 72/0446* (2013.01); *H04W 74/0833* (2013.01); *H04W 76/27* (2018.02)

(58) Field of Classification Search
CPC . H04W 56/001; H04W 36/04; H04W 72/042; H04W 36/0055; H04W 36/30; H04W 74/0833; H04W 72/0446
See application file for complete search history.

(56) References Cited

U.S. PATENT DOCUMENTS

| 2007/0149206 A1* | 6/2007 | Wang | H04W 36/0077 |
| | | | 455/450 |
| 2011/0007707 A1* | 1/2011 | Kazmi | H04W 56/0005 |
| | | | 370/331 |

(Continued)

FOREIGN PATENT DOCUMENTS

| CN | 107872856 A | 4/2018 |
| WO | 2017202267 A1 | 11/2017 |

OTHER PUBLICATIONS

IEEE 802.1AS-2011, "Timing and Synchronization for Time-Sensitive Applications", IEEE Computer Society; Mar. 2011.
(Continued)

*Primary Examiner* — Brenda H Pham

(57) ABSTRACT

Method and apparatus, performed autonomously in a user equipment (UE), for autonomous handover to a target cell of a radio access network (RAN). The method comprises determining, by the UE, an identity of the target cell; receiving, by the UE, a precise time reference broadcast by the target cell, the precise time reference indicating an elapsed time from a predetermined epoch; deriving, by the UE, an uplink timing adjustment based at least in part on the precise time reference, the uplink timing adjustment establishing uplink communication synchronization with the target cell; and transmitting, by the UE, an uplink signal to the target cell in accordance with the derived uplink timing adjustment.

14 Claims, 14 Drawing Sheets

(51) Int. Cl.
  *H04W 72/04* (2009.01)
  *H04W 36/00* (2009.01)
  *H04W 36/30* (2009.01)
  H04W 74/08 (2009.01)
  H04W 76/27 (2018.01)

(56) References Cited

U.S. PATENT DOCUMENTS

2018/0020382 A1 1/2018 Kim et al.
2019/0037559 A1* 1/2019 Son ..................... H04W 56/001

OTHER PUBLICATIONS

"NR; Physical channels and modulation"; 3GPP TS 38.211 V15.3.0 (Sep. 2018).
"NR; Multiplexing and channel coding"; 3GPP TS 38.212 V15.3.0 (Sep. 2018).
"NR; NR and NG-RAN Overall Description; Stage 2"; 3GPP TS 38.300 V15.3.1 (Oct. 2018).
"NR; User Equipment (UE) procedures in Idle mode and RRC Inactive state"; 3GPP TS 38.304 V15.1.0 (Sep. 2018).
"NR; Medium Access Control (MAC) protocol specification"; 3GPP TS 38.321 V15.3.0 (Sep. 2018).
"NR; Radio Resource Control (RRC) protocol specification"; 3GPP TS 38.331 V15.3.0 (Sep. 2018).
"NG-RAN; Architecture description"; 3GPP TS 38.401 V15.3.0 (Sep. 2018).
"Study on Non-Orthogonal Multiple Access (NOMA) for NR"; 3GPP TR 38.812 V0.2.0 (Nov. 2018).
"Study on NR-based Access to Unlicensed Spectrum"; 3GPP TR 38.889 V0.2.0 (Oct. 2018).
R2-1700864, Ericsson, "Conditional handover", 3GPP RAN2#97 Athens, Greece (Jan. 2017).
R2-1809233, TS 36.331 v15.1.0 CR 3341 "Introduction of time reference provision", 3GPP RAN2 #102 Busan, Korea (May 2018).

* cited by examiner

METHOD AND APPARATUS FOR TIME SYNCHRONIZED HANDOVER

CROSS REFERENCE TO RELATED APPLICATIONS

This application claims the benefit of priority to U.S. Provisional Application Ser. No. 62/754,109 filed Nov. 1, 2018, the contents of which are hereby incorporated by reference.

FIELD OF THE INVENTION

The present invention pertains to the field of packet-based data communications in a wireless network and in particular to a method and apparatus for time synchronized handover.

BACKGROUND

A radio access network (RAN) node in a $5^{th}$ generation (5G) system is connected to a core network (CN) control plane entity through an interface called NG-C (or N2) and to a CN user plane entity through an interface called NG-U (or N3). The CN control plane entity is also connected to user equipment (UE) through an interface called N1; the N1 control plane messages are conveyed through the RAN node as non-access stratum (NAS) signalling.

A RAN node may also be connected to user equipment (UE) via a radio link interface (Uu) that comprises several entities associated with the radio link protocol stack: a physical layer (PHY) entity, a medium access control (MAC) entity, a radio link control (RLC) entity, a packet data convergence protocol (PDCP) entity, a service data adaptation protocol (SDAP) entity, and a radio resource control (RRC) entity.

A RAN node may be connected to other RAN nodes via an interface called Xn that includes both a control plane component (Xn-C) and a user plane component (Xn-U). In an LTE system, similar interfaces exist: a RAN node is connected to a CN through an S1 interface and to other RAN nodes through an X2 interface.

A conventional random access procedure in a $3^{rd}$ generation partnership project (3GPP) long-term evolution (LTE) and new radio (NR) compliant system begins with two messages:

Msg1 is a signal transmitted in a physical random access channel (PRACH) from a UE to a RAN node. The PRACH is designed to allow simultaneous uplink transmissions from multiple UEs to be detected by the RAN node even if those uplink transmissions are not time-aligned at the RAN node receiver.

Msg2 is a control plane message transmitted in a physical downlink shared channel (PDSCH) from the RAN node to the UE. The control message—a random access response (RAR) message—includes two information elements:

a cell radio network temporary identifier (C-RNTI) assigned to the UE that is used to identify the UE in subsequent control plane messages transmitted within a serving cell; this includes downlink control information (DCI) transmitted over a physical downlink control channel (PDCCH); and a timing advancement (TA) that the UE should apply to subsequent uplink transmissions to ensure they are aligned to an uplink transmission slot boundary when received by the RAN node. The timing advancement compensates for different signal propagation delays associated with the location of different UEs with respect to the RAN node receiver.

Once timing advancement has been applied, uplink transmissions from the UE are scheduled in a physical uplink shared channel (PUSCH) that is more spectrally efficient than PRACH.

In 3GPP LTE and NR, a conventional handover from a source cell to a target cell involves the following steps:

step 1. measurement configuration and reporting. In this step, the source (i.e. current serving) RAN node provides a UE with information to allow the UE to perform measurements on the signal quality of downlink transmissions from neighbouring cells. The UE then periodically reports those measurements to the source RAN node.

step 2. target cell selection by the RAN. When the source RAN node determines that signal quality in the current serving cell has fallen below a predetermined threshold, the source RAN node selects a target cell for the UE based on the previously reported measurements.

step 3. handover preparation in the target RAN node. The source RAN node prepares the target RAN node for handover through signalling over an intra-RAN network. The source RAN node provides the target with information related to the UE configuration in the current serving cell and the target RAN node provides the source with information related to the UE configuration in the target cell. The information provided by the target RAN node may include a C-RNTI and a dedicated random access preamble for use in the target cell.

step 4. handover preparation of the UE. The source RAN node instructs the UE to handover to the network-selected target cell using the configuration provided by the target RAN node.

step 5. handover execution. The UE performs a random access in the network-selected target cell using the designated C-RNTI and preamble.

step 6. handover completion. When the target RAN node receives an uplink transmission from the UE using the designated C-RNTI and preamble, the target RAN node indicates to the source RAN node that handover has been successfully completed.

If the UE does not initiate an uplink transmission using the designated C-RNTI and preamble within a prescribed time period, handover is deemed to have failed and the UE may initiate radio link failure recovery procedures.

In 3GPP LTE and NR, a cell radio network temporary identifier (C-RNTI) is used to indicate the target UE (or group of UEs) in downlink control information (DCI) transmitted by a RAN node. A DCI provides the indicated target UE (or group of UEs) with a grant of radio resources for an uplink or downlink transmission. Rather than explicitly transmitting the C-RNTI in each DCI, the target UE (or group of UEs) is identified by using the C-RNTI to scramble the 24-bit cyclic redundancy check (CRC) that is attached to a DCI and used for detecting transmission errors in the DCI.

A conventional C-RNTI is a 16-bit value that is valid only within the cell currently providing a radio link connection to the UE. When a C-RNTI is used to scramble the CRC, the 16-bit C-RNTI is extended to 24-bits with the most significant 8 bits ($1 \leq j \leq 8$) set to zero and $$S_i = C_i \oplus R_i$$

where:

i ($1 \leq i \leq 24$) is a bit number with i=1 representing the most significant bit, $C_i$ is bit i of the (unscrambled) CRC,
$R_i$ is bit i of the 24-bit zero-extended C-RNTI,
$S_i$ is bit i of the scrambled CRC, and
$\oplus$ is the xor (modulo-2 addition) operation.

In 3GPP LTE and NR, a precise time reference is broadcast over a radio link in a system information block (SIB) to one or more UEs. The precise time reference indicates the absolute time at which the last symbol of a designated radio frame or sub-frame is transmitted. The granularity of the precise time reference is typically on the order of nanoseconds or microseconds. The precise time reference indicates the elapsed time from a predetermined epoch such as 1980-01-06 00:00:00 hours. The absolute time is traceable to a master clock that distributes precise time to multiple nodes within a RAN; the granularity of this time reference is typically on the order of nanoseconds. With knowledge of the timing adjustment (TA) applicable in a cell, a UE can synchronise its local clock with the precise time reference provided by the RAN.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for time synchronized handover in a wireless communication system.

Embodiments herein provide, in one aspect, a method, performed in a user equipment (UE), for autonomous handover to a target cell of a radio access network (RAN) that circumvents the conventional measurement reporting and random access procedures. The method includes receiving, by the UE, a configuration for autonomous operation within a group of cells of the RAN. The method further includes determining, by the UE, the target cell from the group of cells. The method further includes deriving, by the UE, an uplink timing adjustment that establishes uplink communication synchronization with the target cell. The method further includes transmitting, by the UE, a protocol data unit (PDU) to the target cell in accordance with the derived uplink timing adjustment.

In some aspects, provided is a method for autonomous uplink synchronization with a target cell in a radio access network (RAN). The method comprises receiving, at the UE, a first precise time reference from a first cell of the RAN, the first precise time reference indicating a first elapsed time from a predetermined epoch; determining a first uplink timing adjustment for use with the first cell, the first uplink timing adjustment for establishing uplink synchronization with the first cell; receiving, at the UE, a second precise time reference from the target cell of the RAN, the second precise time reference indicating a second elapsed time from the predetermined epoch; and deriving, by the UE, a second uplink timing adjustment that establishes uplink synchronization with the target cell, the second uplink timing adjustment derived from the first and second precise time references and the first uplink timing adjustment.

In some aspects, the first uplink timing adjustment is determined by the UE based at least in part on a timing adjustment message transmitted to the UE from the first cell.

In some aspects, deriving the second uplink timing adjustment comprises synchronizing a local UE clock to the first precise time reference using the first uplink timing adjustment; and determining the second uplink timing adjustment based on the difference between the local UE clock and the second precise time reference.

In some aspects, the method further comprises performing an uplink data transmission from the UE to the target cell with the uplink data transmission advanced according to the second uplink timing adjustment.

In some aspects, the uplink data transmission includes an identifier assigned to the UE for use in the target cell.

In another aspect, the identifier assigned to the UE is used to identify the UE in subsequent messages transmitted by the target cell.

In some aspects, the subsequent messages include downlink control information (DCI) transmitted over a physical downlink control channel (PDCCH).

In one aspect, at least one of the first and second precise time references is obtained from at least one of a broadcast in a system information block (SIB), and provided on-demand to the UE through a radio resource control (RRC) message.

In yet another aspect, provided is a method for handover to a target cell of a radio access network (RAN). The method comprises determining, by the UE, an identity of the target cell; receiving, by the UE, a precise time reference broadcast by the target cell, the precise time reference indicating an elapsed time from a predetermined epoch; deriving, by the UE, an uplink timing adjustment based at least in part on the precise time reference, the uplink timing adjustment establishing uplink communication synchronization with the target cell; and transmitting, by the UE, an uplink signal to the target cell in accordance with the derived uplink timing adjustment.

In one aspect, the method further comprises deriving the uplink timing adjustment based at least in part on a timing adjustment message transmitted to the UE from a second cell.

In one embodiment, the UE determines the identity of the target cell based on downlink signal measurements performed by the UE.

In another embodiment, the downlink signal measurements include a downlink signal quality measurement.

In some embodiments, the method further comprises determining, by the UE, that the downlink signal quality measurement has dropped below a preestablished signal quality threshold and selecting, by the UE, a new target serving cell.

In one aspect, the precise time reference is broadcast in a system information block (SIB). In another aspect, a user equipment (UE) is provided. The UE comprises a radio network interface for receiving and transmitting protocol data units (PDUs), a processor and a memory device storing instructions. The instructions, when executed by the processor, cause the UE to receive a configuration for autonomous operation within a group of cells of a radio access network (RAN). The instructions further cause the UE to determine a target cell from the group of cells. The instructions further cause the UE to derive an uplink timing adjustment that establishes uplink communication synchronization with the target cell. The instructions further cause the UE to transmit a protocol data unit (PDU) to the target cell in accordance with the derived uplink timing adjustment.

Further provided is a user equipment (UE) comprising a radio network interface for receiving and transmitting protocol data units (PDUs), a processor and a memory storing instructions. The instructions, when executed by the processor, cause the UE to receive a first precise time reference from a first cell of a radio access network (RAN). The instructions further cause the UE to determine a first uplink timing adjustment for use with the first cell, the first uplink timing adjustment for establishing uplink synchronization with the first cell. The instructions further cause the UE to receive a second precise time reference from a second cell of the RAN. The instructions further cause the UE to derive a second uplink timing adjustment that establishes uplink synchronization with the second cell, the second uplink timing adjustment derived from the first and second precise time references and the first uplink timing adjustment.

Also provided is a user equipment (UE) comprising a radio network interface for receiving and transmitting signals over a radio link; a processor; a local UE clock; and a memory storing instructions that when executed by the processor cause the UE to receive, using the radio network interface, a first precise time reference from a first cell of a radio access network (RAN). the first precise time reference indicating a first elapsed time from a predetermined epoch; determine a first uplink timing adjustment for use with the first cell, the first uplink timing adjustment for establishing uplink synchronization with the first cell; receive, using the radio network interface, a second precise time reference from a target cell of the RAN, the second precise time reference indicating a second elapsed time from the predetermined epoch; and derive a second uplink timing adjustment that establishes uplink synchronization with the target cell, the second uplink timing adjustment derived from the first and second precise time references and the first uplink timing adjustment.

BRIEF DESCRIPTION OF THE FIGURES

Further features and advantages of the present invention will be apparent from the following detailed description, taken in combination with the appended drawings, in which.

Throughout the appended drawings, like features are identified by like reference numerals.

DETAILED DESCRIPTION

Figure 1:
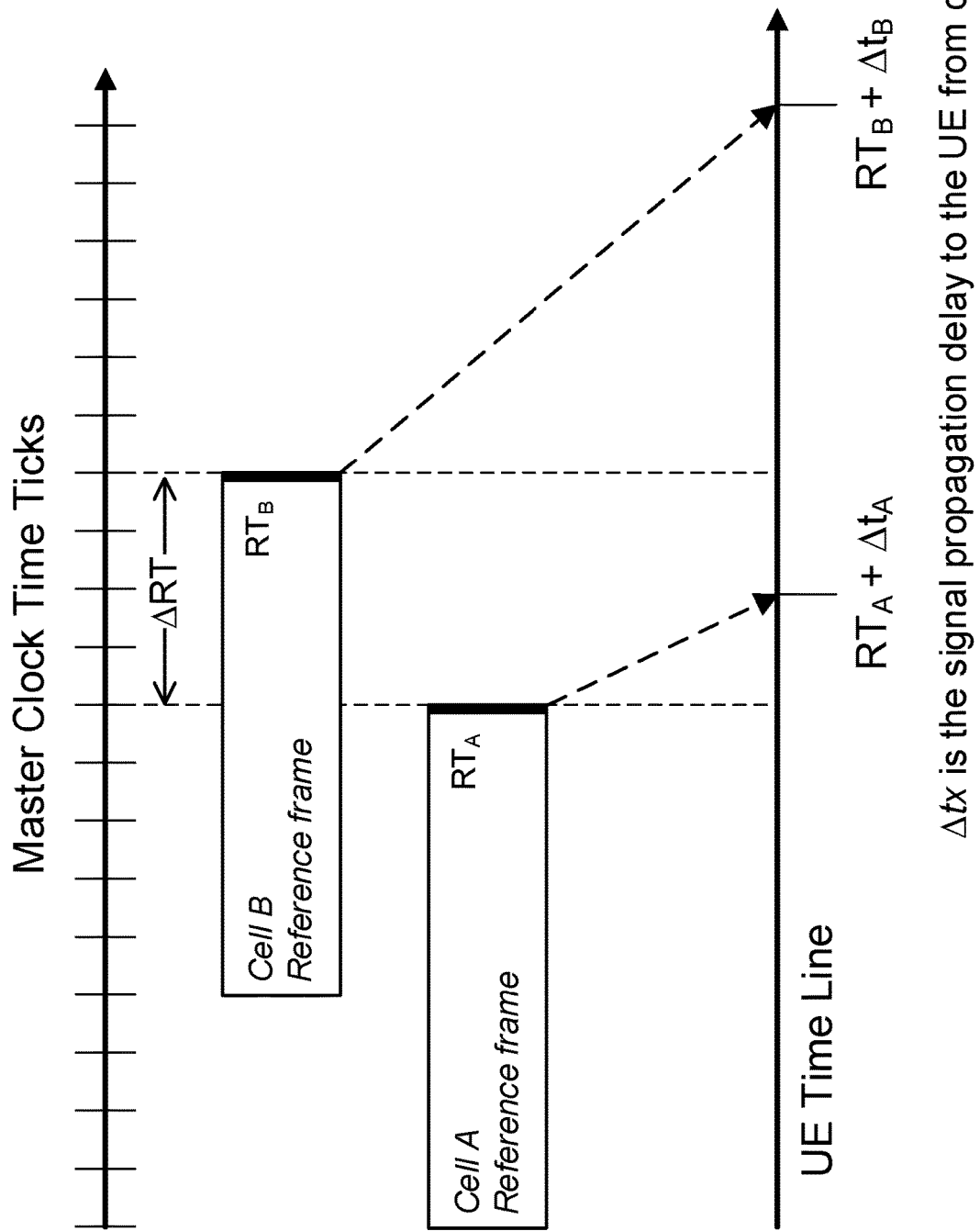
FIG. 1 illustrates, in one embodiment, transmission of a precise time reference in a radio access network (RAN).

Embodiments of the present invention provide advantages by way of autonomous, time synchronized handover performed by a UE that avoids signalling overheads associated with conventional handover (e.g. measurement configuration, measurement reports, time-critical handover preparation of target RAN nodes, etc). Autonomous uplink synchronisation by a UE avoids the latencies and overheads of a random access procedure prior to transmission of uplink data. Use of a RAN mobility group RNTI avoids latencies and overheads in a target RAN node associated with conventional use of a random access procedure for assignment of an RNTI for DCI signalling. A precise time reference broadcast over the air by cells in a RAN can be used by a UE to autonomously compute the timing adjustment required for operation in a new target cell.

In particular, solutions presented in the disclosure herein address the following problems with current wireless system implementations.

Embodiments of the present invention relate to addressing problems with UE handover. Conventionally, handover is preceded by a measurement and measurement reporting phase that incurs signalling overheads and delays associated with the measurement period. When executing a handover and moving from an old serving cell to a new serving cell, a UE conventionally follows a 4-step random access procedure which increases latency and incurs signalling overheads. A RACH-less handover has been proposed as a means to reduce latency. However, a RACH-less handover can only be performed between two cells where radio link transmissions in the two cells are synchronised—e.g. the start of a frame or sub-frame boundary in the old and new serving cells must occur at the same time. In contrast, solutions described in the disclosure herein avoid the measurement reporting phase and bypass the 4-step random access procedure without requiring synchronisation between the old and new serving cells, thus providing a reduction in latency and signalling overheads.

Embodiments of the present invention relate to addressing problems with handover. In contrast to conventional handover procedures where the RAN selects a new serving cell, conditional handover has been proposed as a means to reduce handover failures by allowing a UE to select its new serving cell based on its own measurements, thus avoiding delays associated with measurement reporting. Selection of the new serving cell by the UE is based on a set of target cells and radio signal quality thresholds provided to the UE by the RAN.

Once the new serving cell has been selected, the UE follows a conventional random access procedure to move from the old to the new serving cell. Target RAN nodes for a conditional handover must still be prepared by the source RAN node prior to handover, therefore resources must be reserved for the UE in each of the target cells until the UE selects and re-connects to the new serving cell. While they are reserved, the resources in each of the target cells may not be available for use by other UEs served by the target cell. In contrast, the solutions described in this disclosure allow the UE to autonomously select a new serving cell but do not require resources to be reserved specifically for the UE in each of the potentially new serving cells.

Embodiments of the present invention provide for shortened or reduced-overhead uplink data transmission. Conventionally, before a UE can transit uplink user plane data in a new serving cell, the serving RAN node must provide a UE with information such as timing adjustment (TA) and C-RNTI that is conveyed through control plane signalling that increases latency and overheads. In some instances, such as machine-type communications (MTC) where the user plane data consists of tens of bytes, the control plane traffic may be greater than the user plane traffic. In contrast, the solutions described in this disclosure eliminate some of the control plane signalling that normally precedes an uplink user plane transmission in a new serving cell.

Embodiments of the present invention relate to addressing problems related to unsynchronised uplink transmissions. Theoretically, uplink transmissions may be asynchronous where the signals transmitted from multiple UEs are not time-aligned at the RAN receiver. However asynchronous UE transmissions reduce spectral efficiency and increase the complexity of the RAN receiver, especially when asynchronous uplink transmissions are used in contention-based uplink channels or in multiple access uplink channels such as those using non-orthogonal multiple access (NOMA). Use of a contention-based or multiple access uplink channel is preferred for low latency communications with unpredictable traffic arrival times in order to avoid delays associated with requesting and subsequently scheduling an uplink transmission on dedicated (contention-free) radio resources. However the potential advantage of these channels is reduced if the UE must first synchronise its uplink transmissions with the RAN, a process that may itself incur additional latency and signalling overheads. In contrast, the solutions described in this disclosure provide a reduction in latency and signalling overheads required for a UE to synchronise its uplink transmissions with a RAN receiver.

This disclosure describes mechanisms to enable a UE for autonomous handover through the use of time synchronisation to minimise overheads associated with connection to a new serving cell and with the subsequent transmission of an uplink data packet by the UE. A UE may be a wireless device, mobile station, fixed station, mobile node, human-type communications device, machine-type communications device, or other type of untethered device.

"Autonomous handover" as used herein means that the UE may select a target cell for handover based on its own local measurements rather than being directed to a new serving cell by the RAN—i.e. selection of a new serving cell is performed by a UE rather than by the network. Target cell selection is similar to the procedure used by a UE operating in an inactive state, however procedures for PDU session management are similar to those used by a UE operating in an active (e.g. RRC_CONNECTED) or inactive (e.g. RRC_INACTIVE) state.

To reduce latency and signalling overheads, a UE may avoid conventional random access procedures when entering a new serving cell by autonomously determining the uplink timing adjustment required in the new serving cell based on a precise time reference broadcast by each cell.

In relation to the above, it is noted that transmissions by different cells in a communication system are potentially not frame-aligned, so that the precise time references transmitted by different cells may not be the same. For example, as illustrated in FIG. 1, the transmission of a reference frame from cell A is not time-aligned with the transmission of a reference frame from cell B; therefore the precise time reference transmitted by cell A ($RT_A$) is different from the precise time reference transmitted by cell B ($RT_B$)—e.g. $RT_B = RT_A + \Delta RT$. In addition, the signal propagation delay to the UE from difference cells may be different. For example, as illustrated in FIG. 1, the signal propagation delay from cell A ($\Delta t_A$) is different from the signal propagation delay from cell B ($\Delta t_B$).

Figure 2:
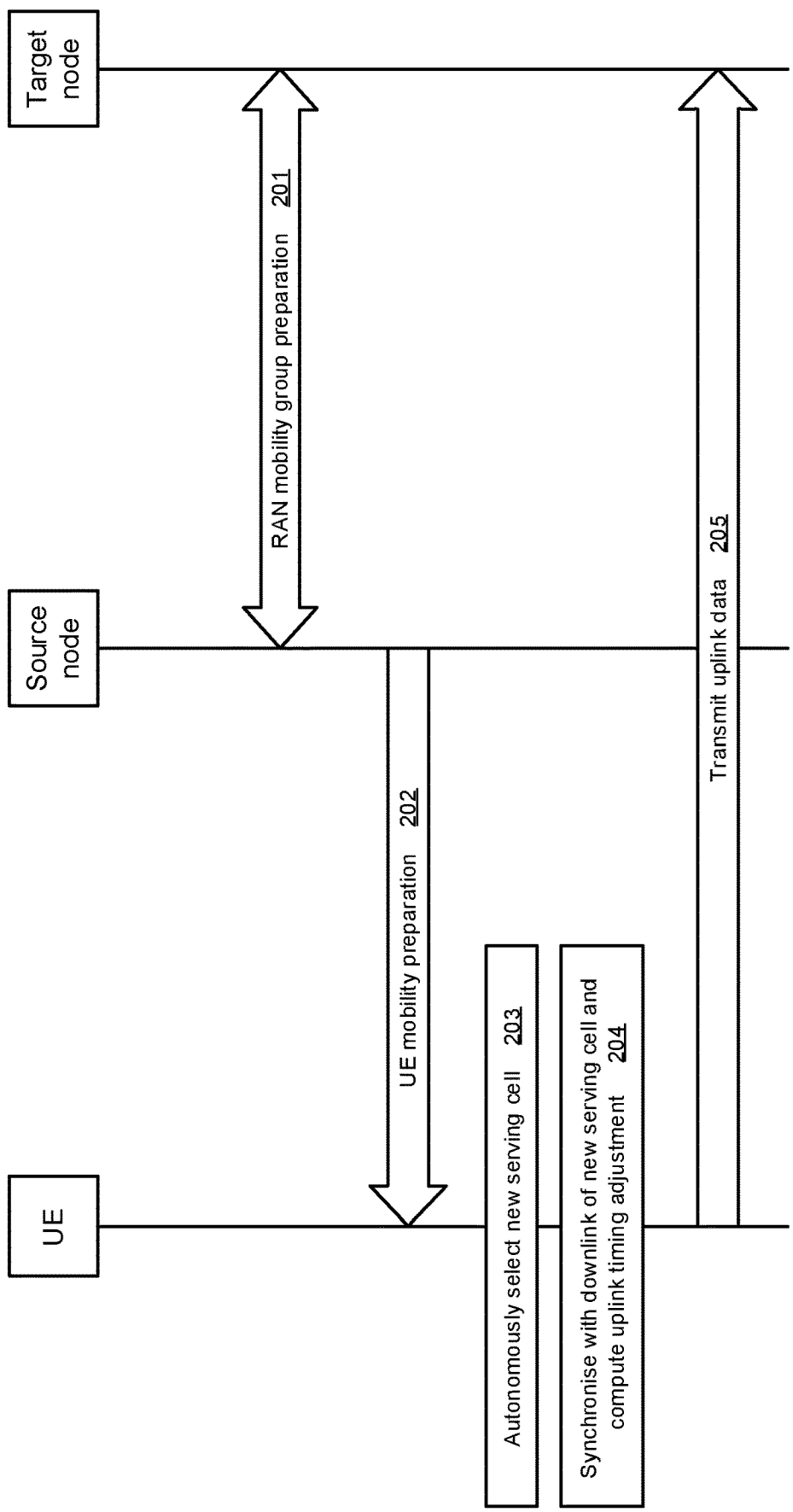
FIG. 2 illustrates, in one embodiment, a time synchronised handover procedure.

With reference now to FIG. 2, the operations in an autonomous, time synchronised handover, according to an embodiment of the present invention, are described as follows.

At operation 201, preparation of a RAN mobility group is performed. A RAN mobility group (RMG) comprises a set of cells subtending one or more RAN nodes that have been configured for autonomous UE handover. Preparation of a RAN mobility group may be performed by a management plane entity through an OAM procedure where an RMG may be pre-configured within a public land mobile network (PLMN) or may be performed by a RAN node that dynamically configures the RAN mobility group through control plane signalling between RAN nodes. A RAN node may be an access point, base station, Node B, evolved Node B (eNB), next generation Node B (NR gNB and LTE ng-eNB), centralised unit (CU), distributed unit (DU) or other form of radio access controller.

At operation 202, preparation of a UE for mobility within an RMG is performed. A source RAN node prepares a UE for mobility within an RMG by configuring the UE with an RMG radio network temporary identifier (RMG RNTI) and a set of shared RMG radio resources. The RMG RNTI identifies the UE within any of the cells of the configured RMG and the shared RMG radio resources are available for use by one or more UEs within any of the cells of the configured RMG.

At operation 203, a UE performs autonomous UE selection of a new serving cell. When the UE has uplink data queued for transmission, it executes a cell selection procedure based, for example, on signal measurements made autonomously by the UE and selects a suitable target serving cell that is also one of its configured RMG cells. For example, the UE may select the cell with the strongest received signal. The target serving cell is selected autonomously by the UE without an exchange of control plane messages with the RAN.

At operation 204, the UE performs synchronous re-entry at the target serving cell. The UE determines the timing adjustment required to synchronise its uplink transmissions with the target serving cell by using a precise time reference broadcast by the target serving cell. The timing adjustment is determined autonomously by the UE without an exchange of control plane messages with the RAN.

At operation 205, the UE performs transmission of uplink data in the new serving cell. Using the computed timing adjustment, the UE bypasses the conventional random access procedure and transmits an uplink data PDU to the new serving cell using the previously assigned RMG RNTI and shared RMG radio resources.

Figure 3:
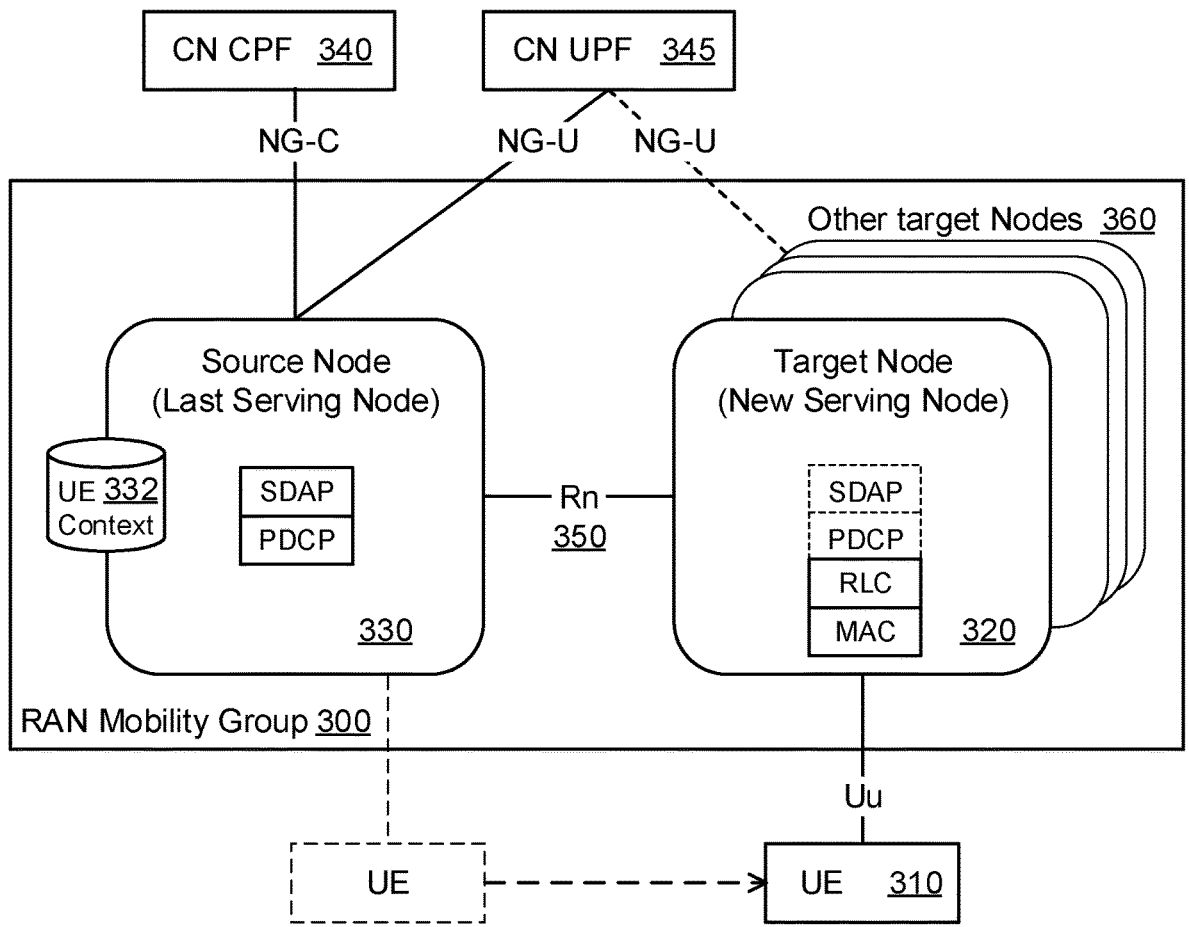
FIG. 3 illustrates, in one embodiment, a network model of a RAN mobility group (RMG).

FIG. 3 illustrates, in one embodiment, a network model of a RAN mobility group (RMG) 300. A RAN mobility group (RMG) comprises a set of cells within a public land mobile network (PLMN) that have been configured for autonomous handover by UE to a target cell.

A source RAN node 330 maintains connections to the core network (CN) control plane function (CPF) 340 for the UE (e.g. via a 5G NG interface or a 4G S1 interface). The source RAN node 330 maintains, or has access to, the current configuration and other contextual information 332 associated with the UE 310. The RAN node 330 is typically the last serving RAN node for the UE 310.

One or more target nodes 360 denote the RAN nodes with one or more subtending cells included in the set of cells that comprise the RMG 300. When a UE 310 autonomously selects a serving cell subtending a target RAN node 360 that is different from the source RAN node 330, that target RAN node becomes the new serving RAN node 320. In contrast to network-directed handover, RAN nodes within the RMG retain their role as a target RAN node 360 even when the UE completes an autonomous handover to a new serving RAN node 320—i.e. a RAN node is removed from an RMG either through a re-configuration of the RMG or, in some embodiments, through expiration of a timer.

The source RAN node 330 may be connected via an intra-RAN network to one or more other RAN nodes 360 within the PLMN. The interface between RAN nodes, called Rn 350 in FIG. 3, may be similar to an X2 interface, to an Xn interface, or to a CU-DU interface.

In some embodiments, the lower layers of the radio link protocol stack (PHY, MAC and RLC) are handled by the new serving (target) RAN node 320 for a UE 310 operating in autonomous mode while the upper layers of the protocol stack (PDCP and SDAP) are handled by the last serving (source) RAN node 330. In these embodiments, the source RAN node 330 maintains connections to at least one CN CPF 340 and to at least one CN user plane function (UPF) 345.

In some embodiments, all layers of the radio link protocol stack (PHY, MAC, RLC, PDCP and SDAP) are handled by the new serving (target) RAN node 320. In these embodiments, the new serving (target) node 320 may also maintain connections to at least one CN UPF 345.

An RMG 300 may be associated with a particular UE or may be associated with multiple UEs. When associated with multiple UEs, an RMG may be pre-configured within a public land mobile network (PLMN) (e.g. through an operations administration and maintenance (OAM) procedure) or may be dynamically configured through control plane signalling between RAN nodes. When associated with a particular UE, the RMG is typically configured dynamically by the source RAN node.

A cell subtending a particular RAN node may be associated with zero, one or more RMGs. In some embodiments, a cell may be configured to broadcast one or more RMG identifiers in a system information block (SIB). A UE is typically associated with at most one RMG.

While operating autonomously within an RMG, a UE is assigned an RMG radio network temporary identifier (RNTI) by its source RAN node that allows the UE contextual information and, optionally, the source RAN node to be identified by a target RAN node within the RMG. An RMG RNTI may be assigned for exclusive use by the UE or it may be shared by multiple UEs.

While a conventional cell RNTI (C-RNTI) is a 16-bit value that is valid only within the cell serving the UE when the RNTI was assigned, an RMG RNTI is a 24-bit value that is valid in all cells of the RMG. To prevent conflicts with cell-specific C-RNTI values, an RMG RNTI must have one or more non-zero bits in the most significant 8 bits (i.e. in bits 1-8 where bit 1 is the most significant bit).

When an RMG RNTI is used to scramble the CRC in a DCI message, the full 24-bits of the RMG RNTI are used—i.e. an RMG RNTI is not zero-extended like a conventional C-RNTI when used to scramble a DCI CRC. The scrambled CRC is computed using the conventional algorithm as described above:

$$S_i = C_i \oplus R_i$$

An RMG RNTI may be an unstructured 24-bit value from a flat number space or it may be a structured value that encodes at least a source RAN node identifier and a UE context identifier. In some embodiments, the association between an unstructured RMG RNTI and the source RAN node may be explicitly signalled by the source RAN node to other RAN nodes in the RMG when the RMG RNTI is assigned to a UE. In other embodiments, a set of RMG RNTIs may be associated with a particular RAN node through dynamic signalling between RAN nodes or through an OAM procedure.

In other embodiments, the association between an unstructured RMG RNTI and a UE context identifier may be explicitly signalled by the source RAN node to other RAN nodes in the RMG. In some embodiments, the UE context associated with the RMG RNTI may also be explicitly signalled by the source RAN node to other RAN nodes in the RMG.

In some embodiments of a structured RMG RNTI, the source RAN node identifier may comprise the n most significant bits of the RMG RNTI and the UE context identifier may comprise the remaining (24-n) bits where the value of n may be pre-defined or configurable. In other embodiments, the boundary between source RAN node identifier and UE context identifier may be determined through encoding of the RMG RNTI. For example, the encoding format may be identified in the m most significant bits from which the value of n, encoding the source RAN node identifier, may be determined.

While operating autonomously within an RMG, a UE may be provided with the configuration of an RMG uplink shared data channel (USDCH) that may be used by the UE to transmit an uplink protocol data unit (PDU) within a new serving cell. The radio resources associated with the RMG USDCH are available to the UE in all cells of its configured RMG allowing a UE to transmit an uplink PDU without first receiving, via a DCI message, an explicit allocation of radio resources from the serving cell.

Embodiments of an RMG USDCH may include a contention-based channel where simultaneous uplink transmissions using the RMG USDCH collide destructively and prevent decoding of the transmissions by a RAN node. A UE intending to transmit a PDU using the RMG USDCH may use a collision avoidance procedure such as listen-before-talk (LBT) to reduce the possibility of a collision. If a collision is detected, a UE may use a collision resolution procedure such as randomised backoff interval before attempting a retransmission of the PDU using the RMG USDCH.

Embodiments of an RMG USDCH may include a multiple-access channel where simultaneous uplink transmissions using the RMG USDCH may be successfully decoded by a RAN node. For example, a non-orthogonal multiple access (NOMA) channel allows simultaneous uplink transmissions from multiple UEs to be successfully decoded based on the demodulation reference signal and code book used by a UE for encoding its uplink transmission.

One or more uplink shared data channels may be configured within the cells of an RMG. When a UE is configured for autonomous handover within an RMG, the source RAN node may provide the UE with information associated with its assigned USDCH; this information may include one or more of: time resource, frequency resource, transmit power level, demodulation reference signal, code book, preamble, modulation and coding scheme.

Other parameters associated with an RMG USDCH may be dynamically signalled by a cell in the RMG using, for example, a system information block (SIB) or a DCI in a physical downlink control channel (PDCCH). In some embodiments, the parameters signalled by a cell may designate a pool of radio resources (e.g. preamble, demodulation reference signal, code book) from which a UE randomly selects the resource to be used for its transmission in the USDCH.

Figure 4:
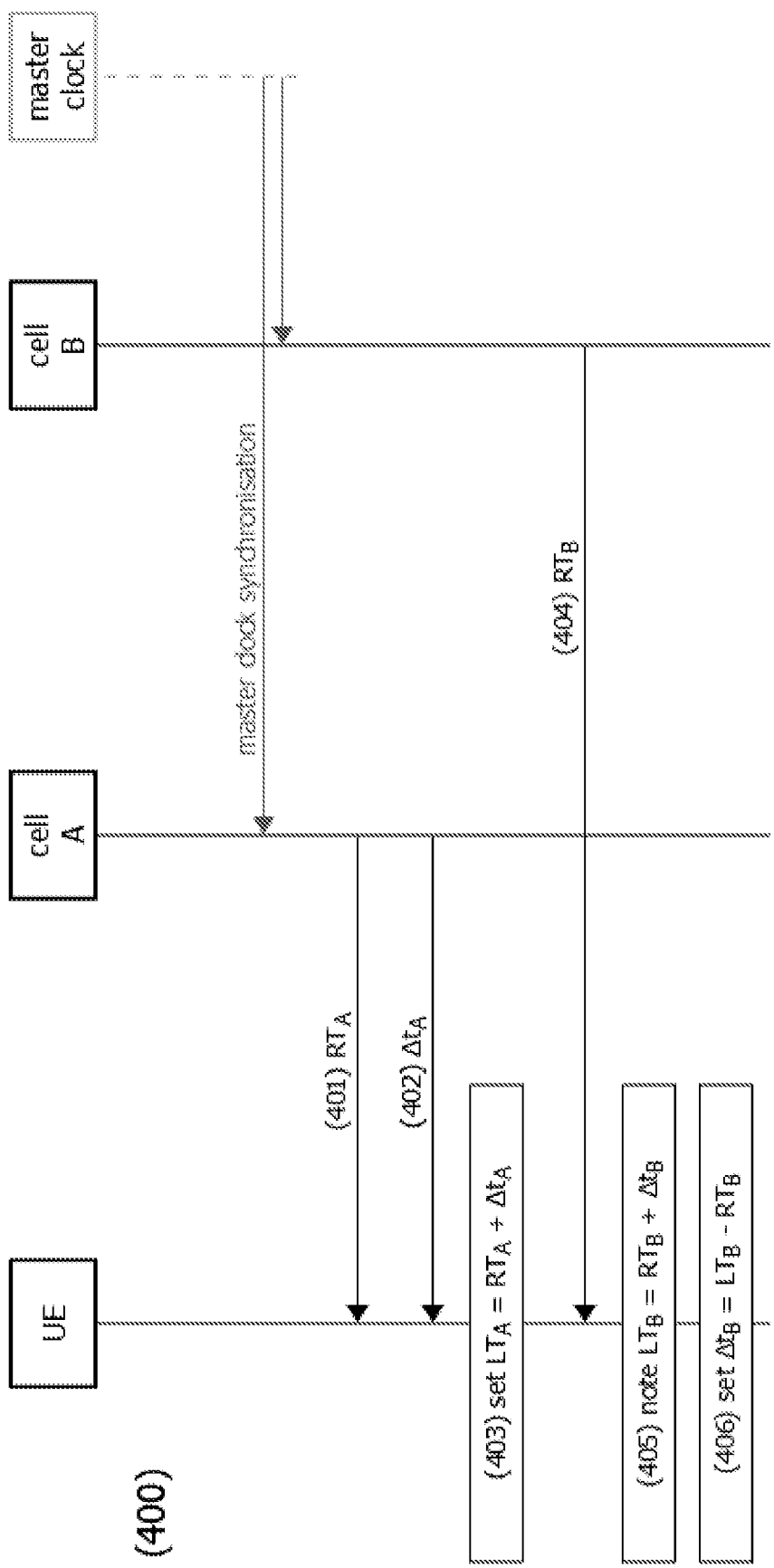
FIG. 4 illustrates, in one embodiment, a scheme of determining a timing adjustment using a precise time reference.

FIG. 4 illustrates, in one embodiment, a procedure 400 for determining a timing adjustment using a precise time reference. In order to bypass the conventional random access procedure, a UE can autonomously determine the timing adjustment (TA) required for uplink transmission in a new serving cell (cell B) from the timing adjustment used in its current source cell (cell A) and from the precise time reference broadcast by the source and target cells.

At operation 401, the UE receives a precise time reference from cell A ($RT_A$) and may receive a precise time reference from cell B ($RT_B$). As indicated earlier, cell transmissions may not be frame-aligned so that the transmitted reference time transmitted by cell B may not be the same; for example, $RT_B=RT_A+\Delta RT$. $\Delta RT$ is thus defined as a difference between the two precise time references.

At operation 402, the UE is synchronised to cell A and has received an uplink timing adjustment ($\Delta t_A$) from cell A to compensate for the signal propagation delay.

At operation 403, the UE is then able to synchronise the time of its local clock $LT_A$ to the reference time from cell A ($RT_A$); that is, $LT_A=RT_A+\Delta t_A$.

At operation 404, the UE subsequently receives a precise time reference from cell B ($RT_B$). At operation 405, the UE notes that the reference time $RT_B$ was received at time $LT_B$ according to its local clock; that is, $LT_B=RT_B+\Delta t_B$. $LT_A$ and $LT_B$ may be viewed as the times, according to the UE's local clock, at which the reference times $RT_A$ and $RT_A$ are received, respectively.

At operation 406, the UE is then able to determine the timing adjustment ($\Delta t_B$) required to synchronise uplink communications with cell B; that is, $\Delta t_B=(LT_B-RT_B)$.

As will be readily understood from the above, and in more general terms, deriving the timing adjustment ($\Delta t_B$) can include synchronising a local UE clock to the first precise time reference $RT_A$ using the first uplink timing adjustment $\Delta t_A$; and determining the second uplink timing adjustment based on the difference between the local UE clock and the second precise time reference $RT_B$.

The UE can obtain the reference time from the source cell (e.g. $RT_A$ from cell A) at any time prior to obtaining the reference time from the target cell (e.g. $RT_B$ from cell B). Once obtained, the reference time from the source cell (e.g. $RT_A$) is deemed to be valid for a period of time (the synchronisation period) where the potential drift of the local UE clock is less than some maximum value; in some embodiments, the clock drift cannot exceed the cyclic prefix of an LTE or NR OFDM symbol. If necessary, the UE should obtain an updated reference time and timing adjustment from the source cell before expiration of the synchronisation period.

Figure 5:
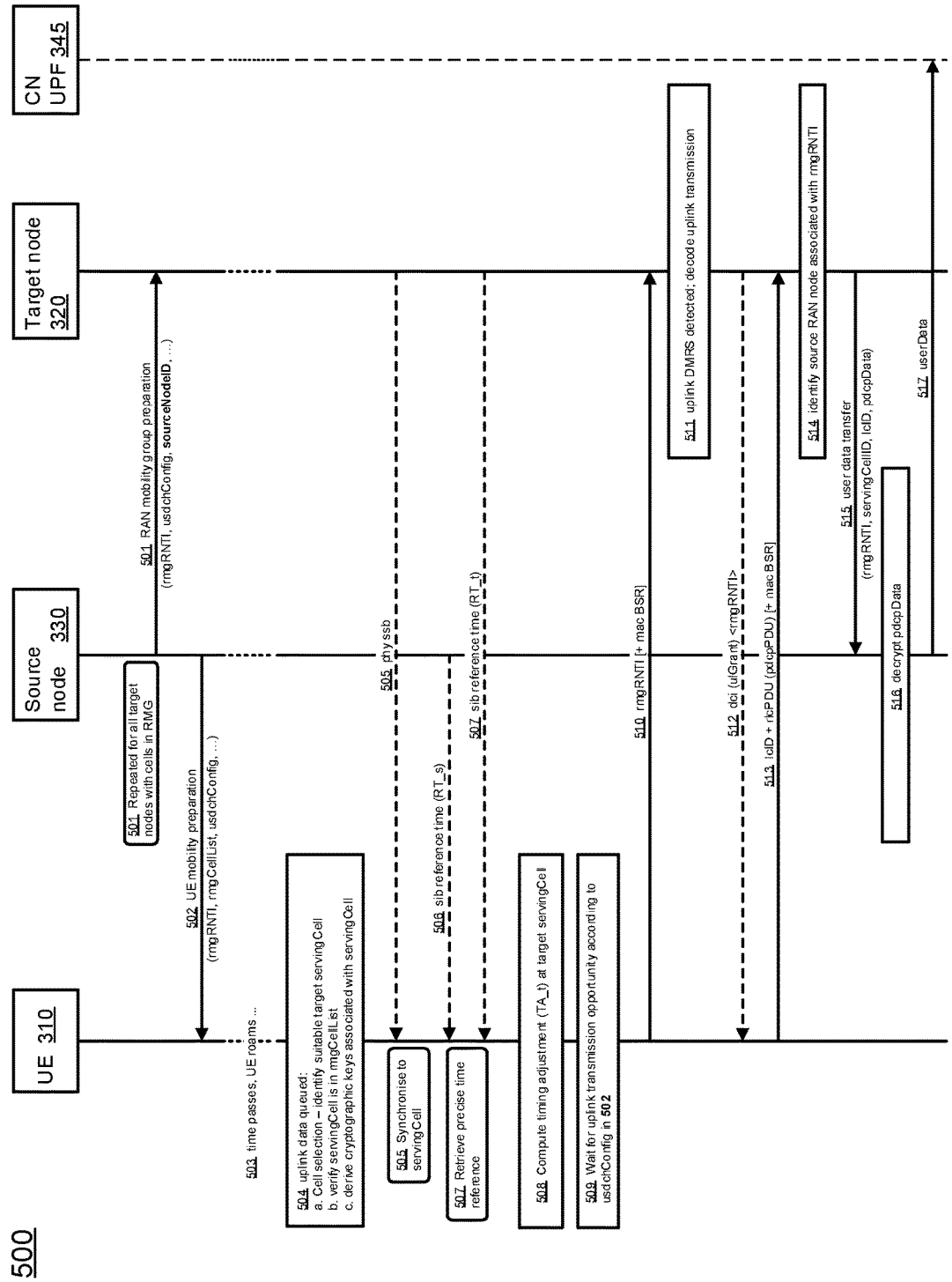
FIG. 5 illustrates, in one embodiment, an autonomous time synchronised handover with centralised user equipment (UE) context.

FIG. 5 illustrates, in one embodiment, a procedure for UE autonomous, time synchronised handover where the UE context 332 is maintained only at the source (last serving) RAN node 330. In this procedure, the lower layers of the radio link protocol stack (PHY, MAC and RLC) are handled by the new serving (target) RAN node 320 while the upper layers of the protocol stack (PDCP and SDAP) are handled by the last serving (source) RAN node 330.

At operation 501, the configuration for a RMG is distributed to all RAN nodes with cells in the target RMG. The RMG configuration, which may be pre-configured through an OAM procedure or (as shown) dynamically signalled by the source RAN node 330, may include a USDCH configuration, an RMG RNTI used to identify one or more UEs within the RMG, and the identity of the source RAN node 330 associated with the RMG RNTI.

At operation 502, to prepare the UE for autonomous mobility, the source RAN node 330 may configure the UE 310 with a set of cells and/or an RMG identifier comprising the RMG where the UE may operate autonomously, a USDCH configuration for use by the UE within the RMG, and an RMG RNTI to be used by the UE 310 for identification within the RMG.

At operation 503, once configuration by the source RAN node 330 has been completed, the UE 310 may begin autonomous operation within the RMG. The UE 310 may continue to operate autonomously within the RMG until it receives a configuration from the RAN disabling autonomous operation. The UE 310 may be required to disable autonomous operation if it roams outside the coverage area of the RMG. In some embodiments, the UE 310 may be required to disable autonomous operation after expiry of a timer configured by the RAN. The UE 310 may operate autonomously while in an active state (such as RRC_CONNECTED) or while in a low-energy state (such as RRC_INACTIVE).

At operation 504, at a given point in time, the UE 310 has uplink data queued for transmission and begins cell selection to select a target serving cell. If the selected cell is in the configured RMG, the UE 310 may continue (at operation 505) with autonomous operation; otherwise, the UE 310 may be required to disable autonomous operation and reconnect to the selected cell (e.g. by using a random access procedure) to resume non-autonomous operation in a connected state (such as RRC_CONNECTED).

The UE 310 may be configured by the RAN to give preference to a target cell that is within the RMG over a cell that is not within the RMG, that is, a cell that is not within the RMG will be selected only if no cell that is within the RMG can be found with a suitable signal quality.

At operations 505-508, the UE derives an uplink transmission timing adjustment for the selected target cell (TA_t). At operation 505, the UE 310 obtains downlink frame synchronisation with the target cell by acquiring synchronisation signals broadcast by the cell. In 3GPP LTE and NR, for example, this may be the primary and secondary synchronisation signals broadcast in a synchronisation signal block (SSB).

Operation 506, where the UE 310 obtains a precise time reference from the source cell (RT_s), may be performed at any time prior to operation 508; operation 506 may, for example, be performed prior to any of operations 505, 504, 503 or 502.

At operation 507, the UE 310 obtains a precise time reference from the target cell (RT_t) and, if it has not already done so (at operation 506), from the source cell (RT_s). In 3GPP LTE and NR, for example, the precise time reference may be broadcast in a system information block (SIB) or may be provided on-demand to a UE through a radio resource control (RRC) message.

At operation 508, using knowledge of the timing adjustment used in the source cell (TA_s), the UE 310 computes the timing adjustment required in the target cell (TA_t) as described, for example, in operation 406.

At operation 509, using the USDCH configuration provided by the source RAN node 330 in operation 502, the UE waits for a transmission opportunity and initiates an uplink transmission using the assigned USDCH resources and with the uplink transmission advanced according to the timing adjustment computed in operation 508.

At operation 510, the information included in the uplink USDCH transmission comprises at least the RMG RNTI assigned to the UE. If there are sufficient USDCH resources assigned, the UE 310 may also include a MAC buffer status report (BSR) and/or (the first segment of) an RLC data PDU containing the queued data and corresponding logical data channel identifier.

At operation 511, the target RAN node 320 detects the USDCH demodulation reference signal, decodes the uplink USDCH transmission and retrieves the RMG RNTI transmitted by the UE 310.

At operation 512, the target RAN node 320 schedules an uplink transmission for the UE 310 and signals the assigned uplink resources in a DCI message encoded with the RMG RNTI received from the UE 310 in operation 511.

At operation 513, using the assigned uplink resources, the UE 310 transmits (another segment of) an RLC data PDU containing the queued data and corresponding logical data channel identifier. The UE 310 may also include a MAC buffer status report to indicate whether additional uplink data is queued at the UE 310. This uplink transmission is typically scheduled in dedicated radio resources over a contention-free uplink channel. Subsequent uplink and/or downlink transmissions scheduled by the target RAN node 320 (e.g. for hybrid automatic repeat request (HARD) and RLC re-transmissions) continue to be signalled with DCI messages encoded using the RMG RNTI.

At operation 514, the target RAN node 320 associates the received RMG RNTI with the corresponding source RAN node 330 based either on pre-configured RMG information (operation 501) or on the encoding of a structured RMG RNTI.

At operation 515, the target RAN node 320 extracts the PDCP data PDU transmitted in the RLC data PDU and forwards the PDCP data PDU to the source RAN node 330 along with the RMG RNTI and logical data channel identifier provided by the UE 310.

At operation 516, using the security configuration from the UE context associated with the RMG RNTI, the source RAN node 330 decrypts and validates the PDCP data PDU.

At operation 517, the source RAN node 330 forwards the resulting user plane data PDU to the CN user plane function (UPF) associated with the logical data channel indicated by the UE 310.

Figure 6:
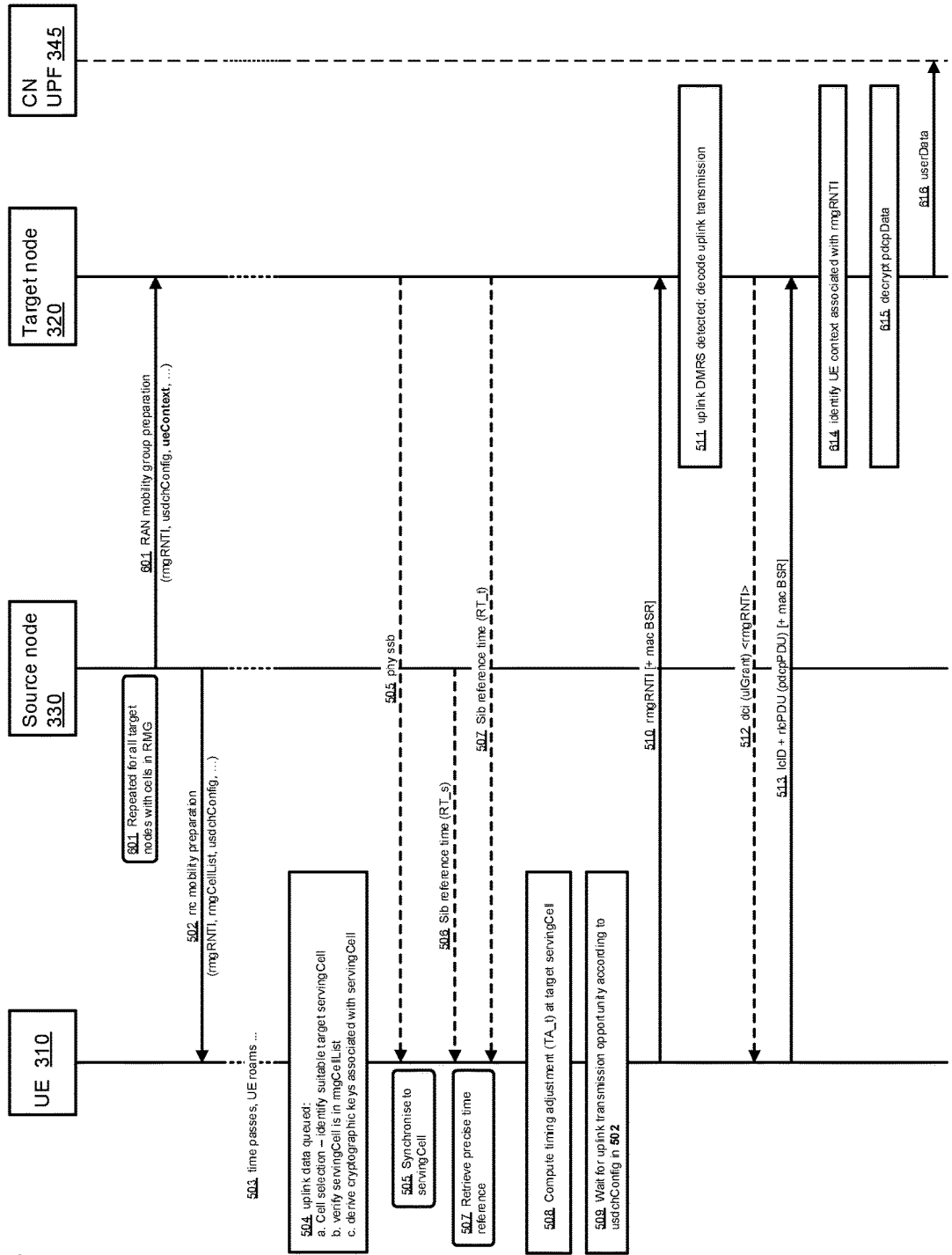
FIG. 6 illustrates, in one embodiment, an autonomous, time synchronised handover with distributed UE context.

FIG. 6 illustrates a procedure for UE autonomous, time synchronised handover where the UE context 332 is distributed by the source (last serving) RAN node 330 to target RAN nodes 360 within the RMG. In this procedure, all layers of the radio link protocol stack (PHY, MAC, RLC, PDCP and SDAP) are handled by the new serving (target) RAN node 320 using the stored UE context. In some embodiments, the new serving (target) RAN node 320 may be able to forward uplink PDUs directly to the CN UPF 345 rather than forwarding uplink PDUs indirectly through the source RAN node 330.

At operation 601, as in operation 501 of FIG. 5, the configuration for an RMG is distributed to all RAN nodes with cells in the target RMG. In addition, the RAN nodes of the target RMG also receive an indication of the RAN context that is associated with UEs authorised for autonomous operation within the RMG. At operations 502-513, the UE 310 is then prepared and begins autonomous handover as described in operations 502 through 513 of FIG. 5.

At operation 614, when the target RAN node 320 decodes the RMG RNTI transmitted by the UE 310, it identifies and retrieves the UE context associated with the RMG RNTI based on the pre-configured RMG information (operation 601).

At operation 615, the target RAN node 320 extracts the PDCP data PDU transmitted in the RLC data PDU and, using the security configuration from the UE context associated with the RMG RNTI, decrypts and validates the PDCP data PDU.

At operation 616, if the UE context includes the identity of the associated CN user plane function (UPF) associated with the logical data channel indicated by the UE 310, the target RAN node 320 forwards the resulting user plane data PDU to the CN UPF 345. Otherwise the target RAN node 320 forwards the resulting user plane data PDU to the source RAN node 330 associated with the RMG RNTI.

In order to deliver downlink PDUs to a UE operating in an autonomous mode, the source RAN node 330 may configure the UE 310 for serving cell tracking to ensure that the current serving cell and serving (target) RAN node 320 is always known to the source RAN node 330. If the UE 310 is not configured for serving cell tracking, a downlink PDU may be forwarded to all target RAN nodes within the RMG for attempted delivery.

The delivery procedure chosen by the RAN for a particular UE may involve a trade-off between the signalling overheads associated with serving cell tracking versus the signalling overheads associated with attempted delivery in multiple RAN nodes. For example, serving cell tracking may be more beneficial for a low-mobility UE that does not often change its serving cell or for a UE that receives a high volume of unexpected downlink traffic; attempted delivery in multiple RAN nodes may be more beneficial for a high-mobility UE that often changes its serving cell or for a UE that receives a low volume of unexpected downlink traffic.

Figure 7:
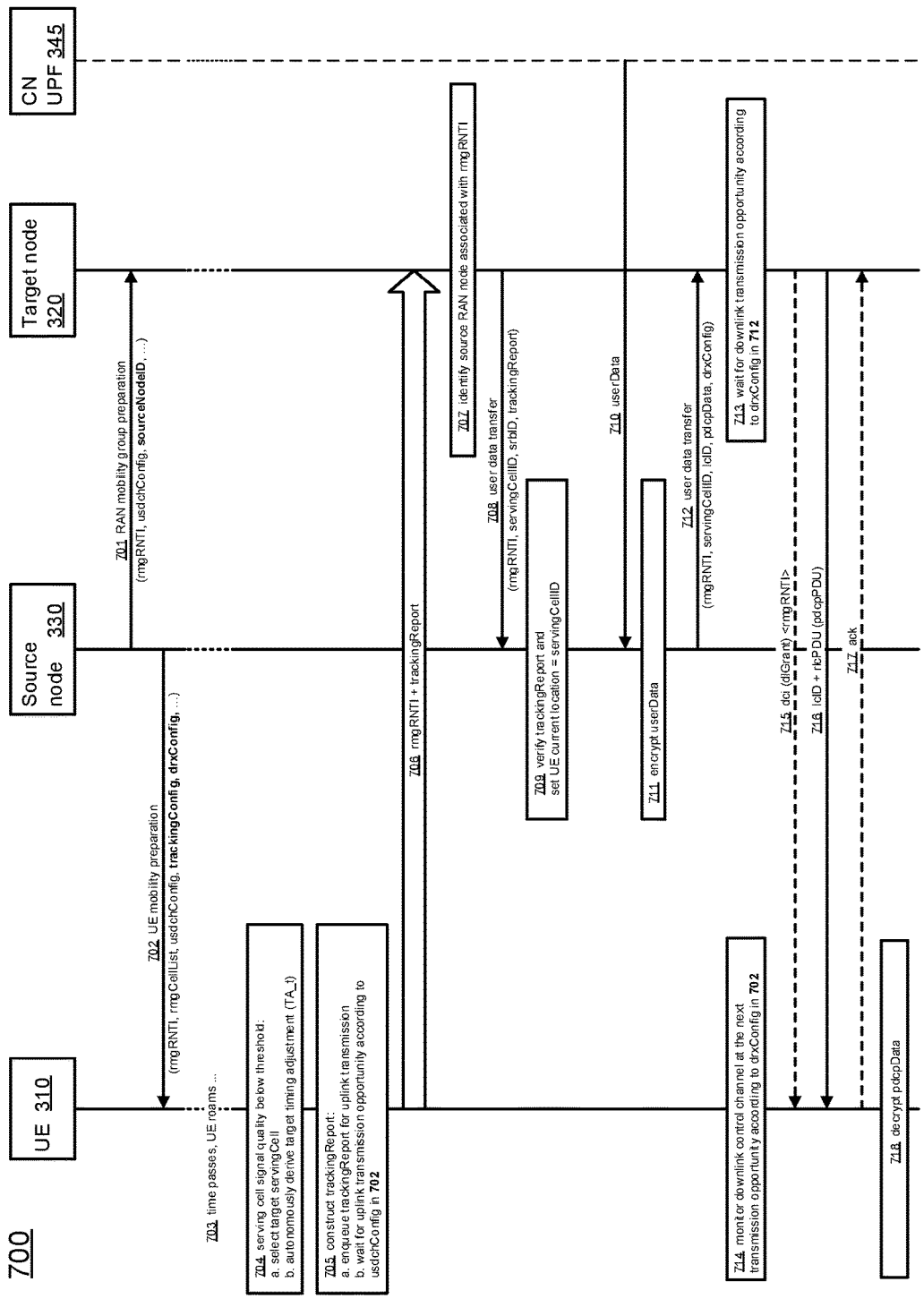
FIG. 7 illustrates, in one embodiment, a scheme of operation in delivery of downlink data via serving cell tracking.

FIG. 7 illustrates, in one embodiment, a scheme of operation in delivery of downlink data via serving cell tracking. When configured for autonomous operation within an RMG 300, a UE 310 may be instructed to select a new serving cell, which may be associated with a new serving (target) RAN node 320, and to transmit a tracking report whenever the signal quality measured by the UE 310 in its current serving cell drops below a certain threshold. Downlink data destined for the UE 310 can be forwarded from the source RAN node 330 directly to the current serving (target) RAN node 320; the current serving (target) RAN node 320 can then schedule the received data for delivery to the UE 310 at the next downlink transmission opportunity.

At operation 701, as in operation 501 of FIG. 5, the configuration for an RMG is distributed to all RAN nodes with cells in the target RMG.

At operation 702, as in operation 502 of FIG. 5, the UE 310 is prepared for autonomous operation within the RMG. In addition, the source RAN node 330 may configure the UE 310 with a tracking configuration, indicating when the UE 310 should send a tracking report to the RAN, which may include a downlink signal quality threshold and a maximum time interval between tracking reports, and a discontinuous reception (DRX) schedule for use by the UE 310 within the RMG, indicating when the UE 310 should monitor the physical downlink control channel (PDCCH) of its serving cell for notifications of pending downlink data delivery.

At operation 703, once configuration by the source RAN node 330 has been completed, the UE 310 may begin autonomous operation within the RMG.

At operation 704, if the UE 310 determines that the downlink signal quality in its current serving cell has dropped below the configured threshold or that the maximum time interval between tracking reports has been reached, the UE autonomously selects a new target serving cell as described in operation 504 and derives an uplink transmission timing adjustment for that cell (TA_t) as described in operations 505 to 508 of FIG. 5.

At operation 705, the UE 310 constructs a control plane tracking report (e.g. a radio resource control (RRC) message) and, using the USDCH configuration provided by the source RAN node 330 in operation 702, waits for an uplink transmission opportunity.

At operation 706, the UE 310 initiates an uplink transmission using the assigned USDCH resources and with the uplink transmission advanced according to the timing adjustment computed in operation 704. The uplink transmission, similar to operations 510 through 513 of FIG. 5, includes the RMG RNTI assigned to the UE and a PDCP data PDU containing the control plane tracking report.

At operation 707, the target RAN node 320 associates the received RMG RNTI with the corresponding source RAN node 330 based on pre-configured RMG information (operation 701).

At operation 708, the target RAN node 320 forwards the PDCP data PDU to the source RAN node 330 along with the identity of the new serving cell, the RMG RNTI and logical data channel identifier associated with the signalling radio bearer provided by the UE 310.

At operation 709, using the security configuration from the UE context associated with the RMG RNTI, the source RAN node 330 decrypts and validates the PDCP data PDU containing the tracking report. If valid, the source RAN node 330 updates its stored UE current location using the new serving cell identifier provided by the target RAN node 320.

At operation 710, at some point in time, the source RAN node 330 receives a downlink user data PDU destined for the UE 310 from the CN UPF 345.

At operation 711, using the security configuration associated with the UE context, the source RAN node 330 constructs and encrypts a PDCP data PDU containing the downlink user data PDU.

At operation 712, using the stored UE current location, the source RAN node 330 forwards the PDCP data PDU to the current serving (target) RAN node 320 along with the RMG RNTI and the DRX configuration provided to the UE 310 in operation 702.

At operation 713, the current serving (target) RAN node 320 uses the DRX configuration to schedule a transmission to the UE at the next downlink transmission opportunity.

At operation 714, similarly, UE uses the DRX configuration provided in operation 702 to monitor the downlink control channel (e.g. PDCCH) in the current serving cell at the next downlink transmission opportunity.

At operation 715, the target RAN node 320 signals the assigned downlink resources in a DCI message encoded with the RMG RNTI received from the source RAN node 330 in operation 712.

At operation 716, using the assigned downlink resources, the UE 310 receives (the first segment of) an RLC data PDU containing the encrypted PDCP data PDU and corresponding logical data channel identifier.

At operation 717, when it successfully decodes the downlink transmission, the UE 310 responds to the current serving (target) RAN node 320 with an uplink transmission comprising a positive acknowledgement (e.g. using a HARQ and/or an RLC ACK) with the uplink transmission advanced according to the timing adjustment computed in operation 704.

At operation 718, using the security configuration associated with the logical data channel identifier, the UE 310 decrypts the PDCP data PDU and processes the resulting user plane data PDU.

Figure 8:
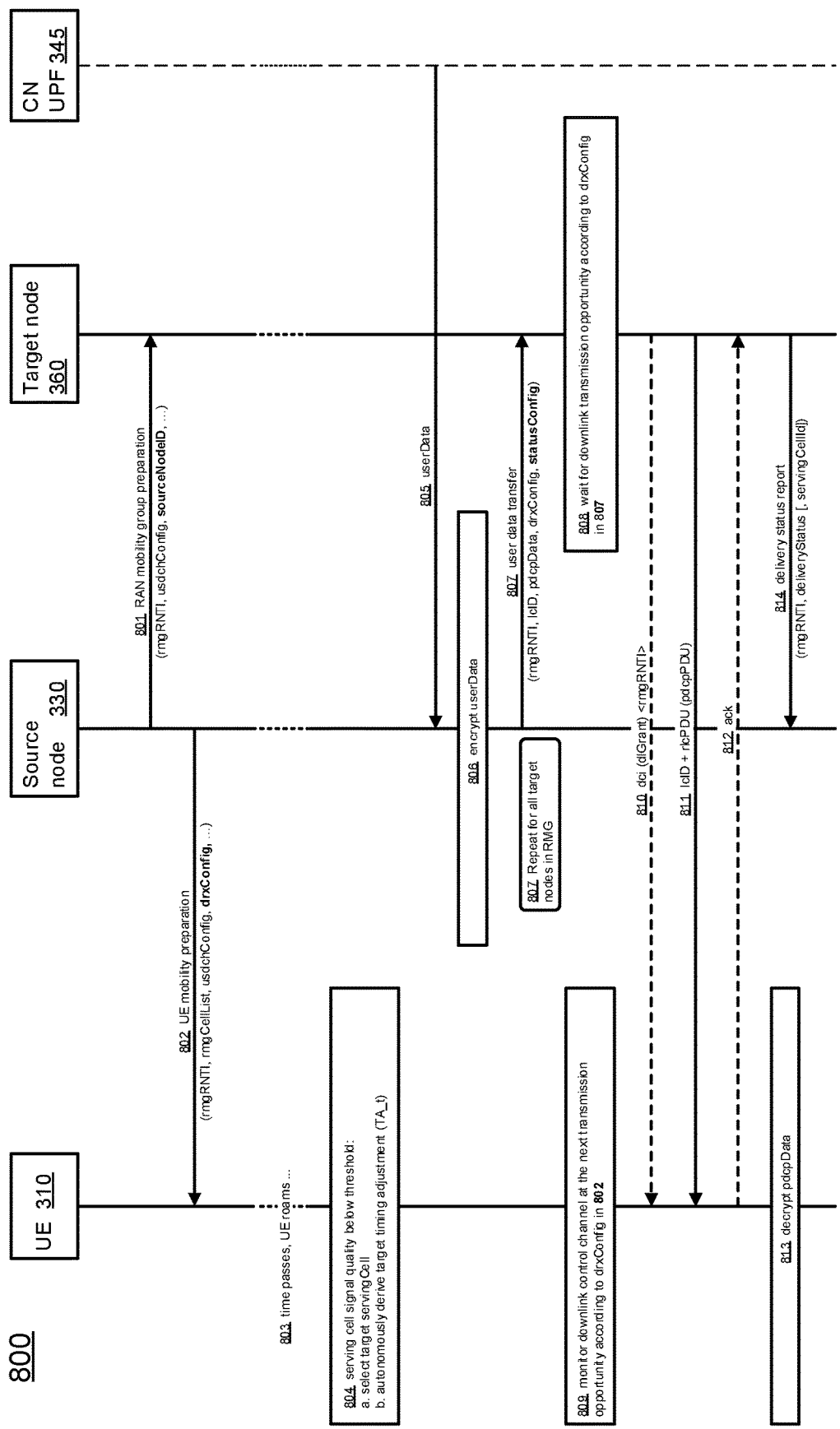
FIG. 8 illustrates, in one embodiment, a scheme of operation in delivery of downlink data via RMG flooding.

FIG. 8 illustrates, in one embodiment, a scheme of operation in delivery of downlink data via RMG flooding. If the UE 310 is not configured for serving cell tracking while operating in an autonomous mode, the current location of the UE may not be known. Since the UE 310 will be synchronised with the serving cell, downlink transmissions can be directly scheduled without incurring overheads and latencies associated with paging and a subsequent page response using a random access procedure.

To avoid latencies and overheads associated with paging to determine the current location of the UE 310, delivery of downlink data to the UE 310 involves forwarding of the downlink data from the source RAN node 330 to all target RAN nodes 360 in the RMG 300.

At operation 801, as in operation 501 of FIG. 5, the configuration for an RMG is distributed to all RAN nodes with cells in the target RMG.

At operation 802, as in operation 502 of FIG. 5, the UE 310 is prepared for autonomous operation within the RMG. In addition, the source RAN node 330 may configure the UE 310 with a discontinuous reception (DRX) schedule for use by the UE 310 within the RMG, indicating when the UE 310 should monitor the physical downlink control channel (PDCCH) of its serving cell for notifications of pending downlink data delivery.

At operation 803, once configuration by the source RAN node 330 has been completed, the UE 310 may begin autonomous operation within the RMG.

At operation 804, if the UE 310 determines that the downlink signal quality in its current serving cell has dropped below an acceptable threshold, the UE 310 autonomously selects a new target serving cell as described in operation 504 and derives an uplink transmission timing adjustment for that cell (TA_t) as described in operations 505 to 508 of FIG. 5.

At operation 805, at some point in time, the source RAN node 330 receives a downlink user data PDU destined for the UE 310 from the CN UPF 345.

At operation 806, using the security configuration associated with the UE context, the source RAN node 330 constructs and encrypts a PDCP data PDU containing the downlink user data PDU.

At operation 807, since the current location of the UE 310 is unknown, the source RAN node 330 forwards the PDCP data PDU to all of the target RAN nodes 360 in the RMG along with the RMG RNTI and the DRX configuration provided to the UE in operation 802. The source RAN node 330 may also include an indication of the type of delivery status report that the target RAN node 320 should return to the source RAN node.

At operation 808, each of the target RAN nodes 360 uses the DRX configuration to schedule a transmission to the UE 310 at the next downlink transmission opportunity.

At operation 809, similarly, UE 310 uses the DRX configuration provided in operation 802 to monitor the downlink control channel (e.g. PDCCH) in the current serving cell at the next downlink transmission opportunity.

At operation 810, each of the target RAN nodes 360 signals the assigned downlink resources in a DCI message encoded with the RMG RNTI received from the source RAN node 330 in operation 806.

At operation 811, using the assigned downlink resources in the current serving cell, the UE 310 receives (the first segment of) an RLC data PDU containing the encrypted PDCP data PDU and corresponding logical data channel identifier.

At operation 812, when the UE 310 successfully decodes the downlink transmission, the UE 310 responds to the current serving (target) RAN node 320 with an uplink transmission comprising a positive acknowledgement (e.g. using a HARQ and/or an RLC ACK) with the uplink transmission advanced according to the timing adjustment computed in operation 804. Other target RAN nodes 360 that are not serving the UE 310 will not receive a positive acknowledgement.

At operation 813, using the security configuration associated with the logical data channel identifier, the UE 310 decrypts the PDCP data PDU and processes the resulting user plane data PDU.

At operation 814, the target RAN nodes 360 report delivery status to the source RAN node 330 according to whether they received a positive acknowledgement to their downlink transmission: if requested by the source RAN node 330, the serving target RAN node 330 may return an indication of successful delivery and may also return the identity of the current serving cell for serving cell tracking; if requested by the source RAN node, the other target RAN nodes may return an indication of unsuccessful delivery.

Figure 9:
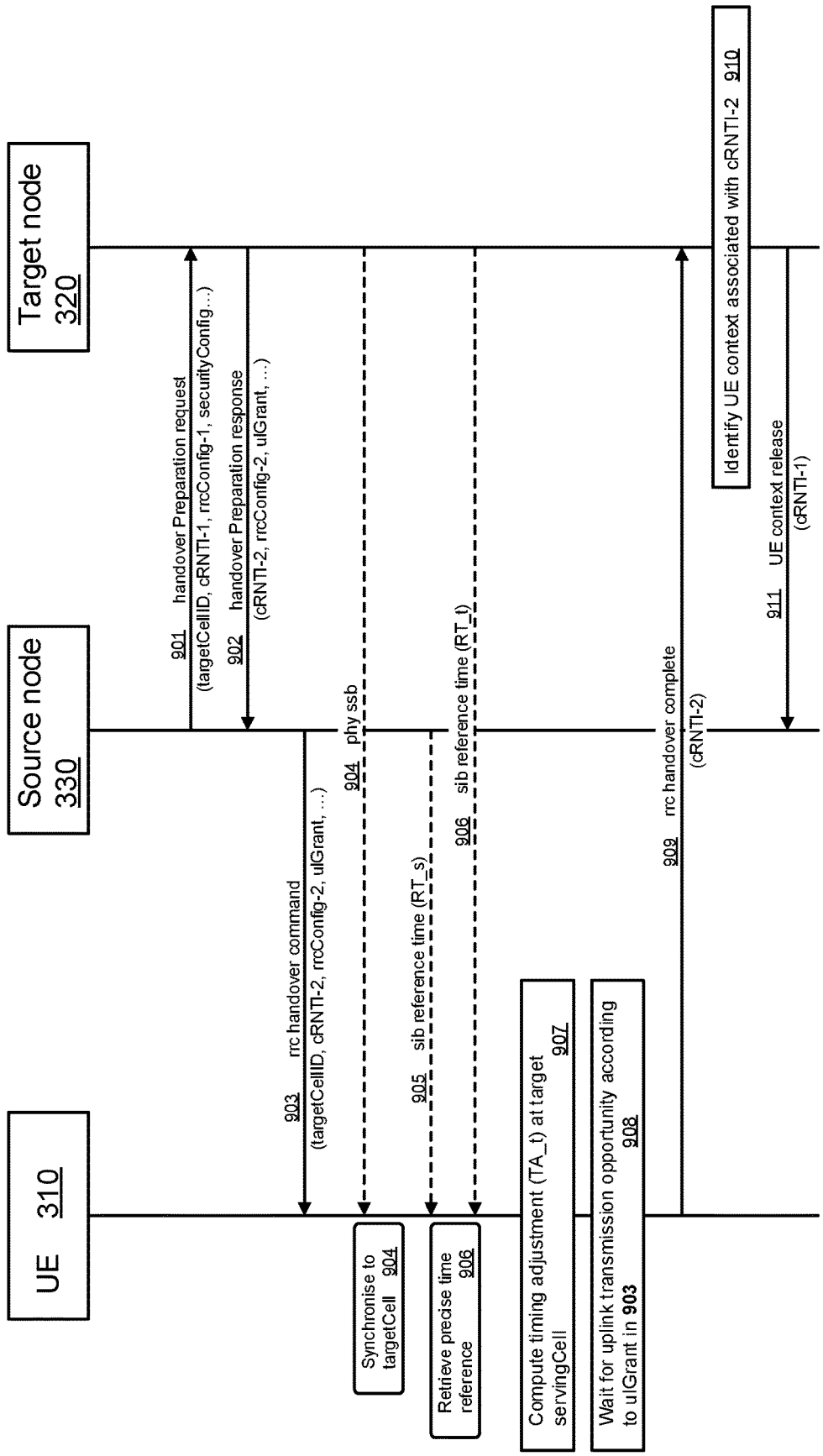
FIG. 9 illustrates, in one embodiment, a scheme of handover between unsynchronised network cells in a time synchronised handover that circumvents a conventional random access procedure.

FIG. 9 illustrates, in one embodiment, a scheme of autonomous handover between unsynchronised network cells that circumvents the latencies associated with a random access procedure in the new serving cell.

At operation 901, based on measurements received from the UE 310, the source RAN node 330 selects a new cell (the target cell) to serve the UE. If the target cell is controlled by another RAN node, the source RAN node sends a handover preparation request to the target RAN node 320 that may include the identity of the target cell, an identifier assigned to the UE for use in the current serving cell (e.g. cell RNTI cRNTI-1), and the radio link and security configuration used by the UE in the current serving cell.

At operation 902, following admission control, the target RAN node 320 provides the source RAN node 330 with configuration information related to UE operation in the target cell. This may include an identifier assigned to the UE for use in the target cell (e.g. cell RNTI cRNTI-2), the radio link and security configuration for use by the UE 310 in the target cell, and an uplink grant indicating the radio resources to be used by the UE 310 for transmission of an initial uplink message in the target cell.

At operation 903, the source RAN node 330 provides the UE 310 with the target cell configuration information that includes an identity of the target cell and instructs the UE 310 to handover to the target cell.

At operation 904, the UE 310 obtains downlink frame synchronisation with the target cell by acquiring synchronisation signals broadcast by the cell. In 3GPP LTE and NR, for example, this may be the primary and secondary synchronisation signals broadcast in a synchronisation signal block (SSB).

Operation 905, where the UE 310 obtains a precise time reference from the source cell (RT_s), may be performed at any time prior to operation 907; operation 905 may, for example, be performed prior to operation 904 or operation 903.

At operations 906 and 907, the UE 310 derives an uplink timing adjustment. At operation 906, the UE 310 obtains a precise time reference from the target cell (RT_t) and, if it has not already done so (in operation 905), from the source cell (RT_s). In 3GPP LTE and NR, for example, the precise time reference may be broadcast in a system information block (SIB) or may be provided on-demand to a UE through a radio resource control (RRC) message.

At operation 907, using knowledge of the timing adjustment used in the source cell (TA_s), the UE 310 computes the timing adjustment required in the target cell (TA_t) as described, for example, in operation 406.

At operation 908, using the uplink grant configuration relayed by the source RAN node 330 in operation 903, the UE 310 waits for the assigned transmission opportunity.

At operation 909, at the designated transmission opportunity, the UE 310 initiates an uplink transmission using the assigned uplink grant resources and with the uplink transmission advanced according to the timing adjustment computed in operation 907. The information included in the uplink transmission comprises at least the identifier assigned to the UE 310 for use in the target cell (e.g. cRNTI-2).

At operation 910, the target RAN node 320 decodes the uplink transmission, obtains the identifier (cRNTI-2) transmitted by the UE 310, and retrieves the associated UE context.

At operation 911, the target RAN node 320 identifies the source RAN node 330 associated with the UE and sends an indication to the source RAN node 330 that handover of the UE 310 is complete, allowing the source RAN node 330 to delete the UE context that it has stored.

It is noted that in an embodiment where the target cell is also controlled by the source RAN node 330, the autonomous handover procedure only includes operations 903 through 909.

When a UE is located in a new serving (target) RAN node through handover, through initiation of an uplink transmission, through a serving cell tracking report, or through an RMG delivery status report, the last serving (source) RAN node may choose either to retain its role as the source RAN node for UE autonomous operations or to transfer the role of source node to the new serving RAN node.

If the last serving RAN node chooses to retain its role as the source RAN node, it may signal its intent to the new serving RAN node but no further action may be required.

If the last serving RAN node chooses to transfer the role of source node to the new serving RAN node, operations at the last serving RAN node may include transferring the UE context to the new serving RAN node, and indicating to the other target RAN nodes in the RMG that it is no longer associated with the RMG RNTI thereby disabling autonomous operation within the RMG for that RNTI.

If the last serving RAN node chooses to transfer the role of source node to the new serving RAN node, operations at the new serving RAN node may include sending a path switch request to the CN to ensure that subsequent downlink PDUs are delivered to the new serving RAN node, reconfiguring the UE to either disable autonomous operation or to re-enable autonomous operation with a possibly different RMG configuration, and configuring a possibly new RMG and the associated set of target RAN nodes if autonomous operation is re-enabled for the UE.

Figure 10:
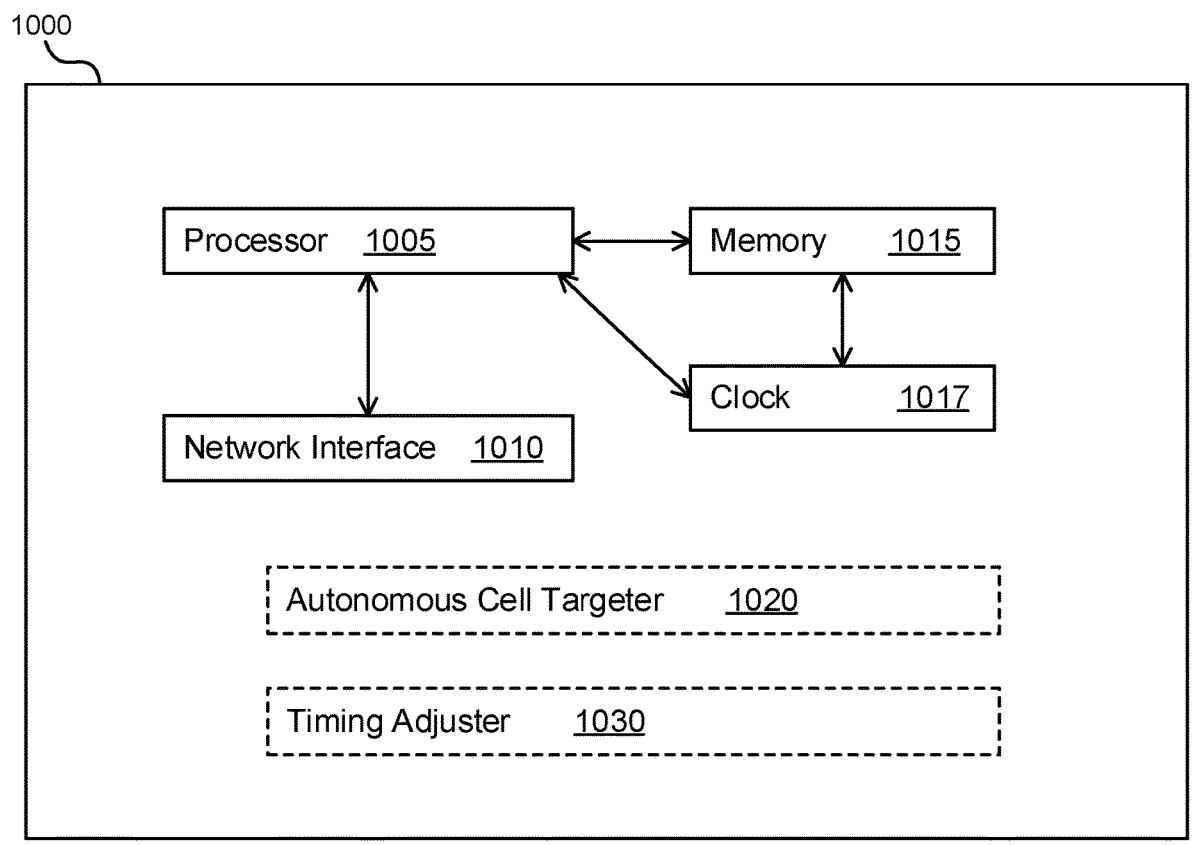
FIG. 10 illustrates, in one embodiment, a structure of an electronic device.

FIG. 10 illustrates a further structure of an electronic device (ED) 1000 that includes, in one embodiment, a processor 1005, a network communication interface 1010 and a non-transitory memory 1015. In some embodiments, the UE, such as UE 310, is an ED 1000 that can be configured to perform the operations as described herein. In some embodiments, rather than or in addition to using a general-purpose computer processor, the ED 1000 can use electronic digital and/or analog circuitry that is configured to perform the operations as described herein. The circuitry can include, for example, ASICs, FPGAs, digital logic gates, etc. In some embodiments, the source RAN node 330 and the target RAN node 320 are each an ED 1000 configured to perform the operations of the source RAN node 330 and the target RAN node 320 as described herein.

The ED 1000 may also include a clock 1017 which can be synchronized to precise time references of the network, for example by incorporating timing adjustments. For example, timing adjustments may be added to the current clock time when the clock is updated to reflect a received precise time reference.

Figure 11:
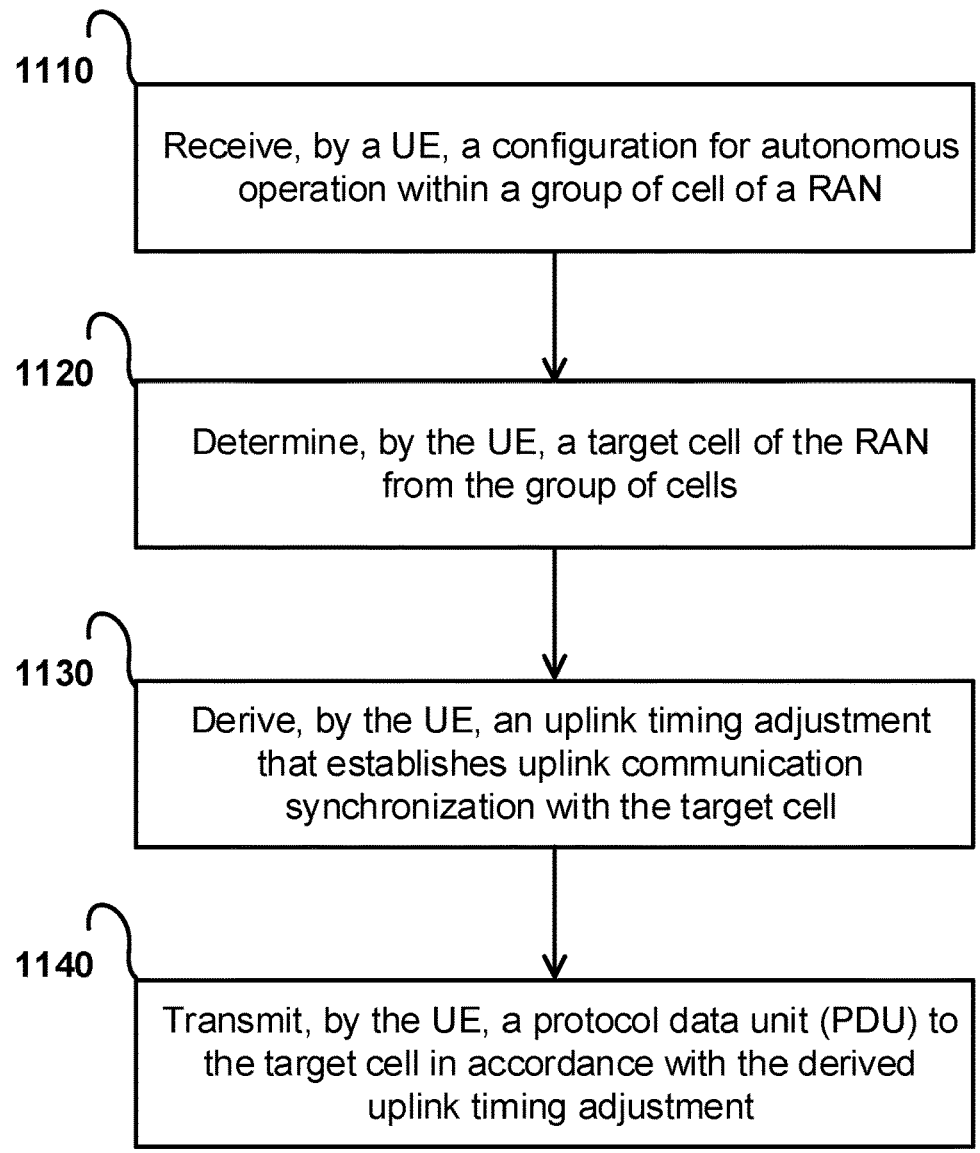
FIG. 11 illustrates, in one embodiment, a method of operation performed in a user equipment (UE), for autonomous handover to a target cell of a radio access network (RAN).

FIG. 11 illustrates, in one embodiment, a method 1100 of operation performed in a user equipment (UE), such as UE 310, for autonomous handover to a target cell of a radio access network (RAN).

The method includes, at operation 1110, receiving, by the UE, a configuration for autonomous operation within a group of cells of the RAN.

The method includes, at operation 1120, determining, by the UE, the target cell from the group of cells.

The method includes, at operation 1130, deriving, by the UE, an uplink timing adjustment that establishes uplink communication synchronization with the target cell.

The method includes, at operation 1140, transmitting, by the UE, a protocol data unit (PDU) to the target cell in accordance with the derived uplink timing adjustment.

Figure 12:
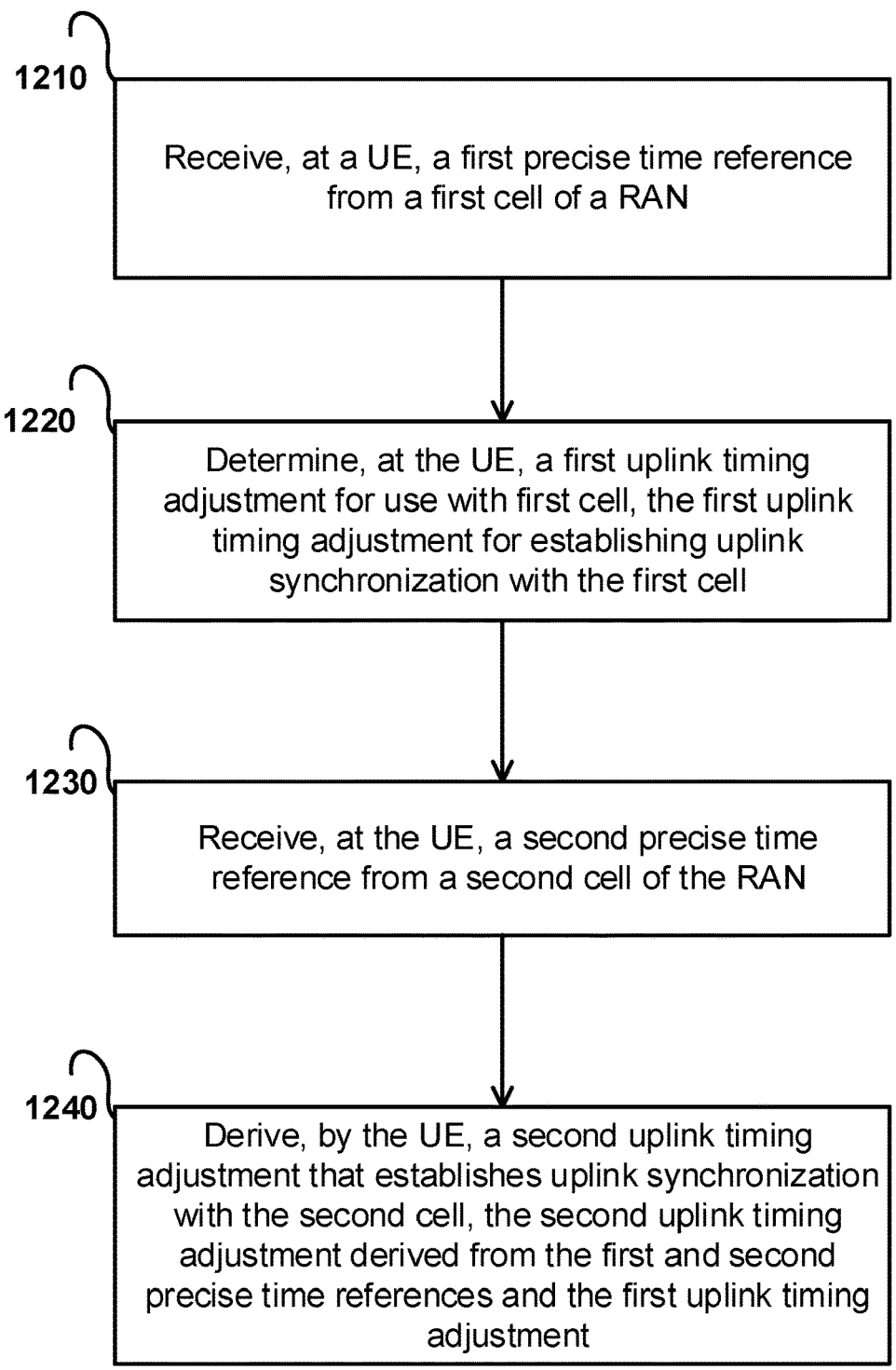
FIG. 12 illustrates, in one embodiment, a method of operation performed in a user equipment (UE), for autonomous synchronisation within a radio access network (RAN).

FIG. 12 illustrates, in one embodiment, a method 1200 of operation performed in a user equipment (UE), such as UE 310, for autonomous synchronisation within a radio access network (RAN).

The method includes, at operation 1210, receiving, at the UE, a first precise time reference from a first cell of the RAN.

The method includes, at operation 1220, determining a first uplink timing adjustment for use with the first cell, the first uplink timing adjustment for establishing uplink synchronization with the first cell. The first uplink timing adjustment may be determined based at least in part on a timing adjustment message transmitted to the UE from the first cell. Alternatively, the first uplink timing adjustment may be derived by the UE in a similar manner to the second uplink timing adjustment, as described herein. This may be the case when the UE has been previously moving from cell to cell. However, in this case, it may be required to obtain an original timing adjustment (on which to base subsequent timing adjustments, including the first and second timing adjustment) based on a timing adjustment message transmitted to the UE from some prior utilized cell.

The method includes, at operation 1230, receiving, at the UE, a second precise time reference from a second cell of the RAN. It is noted that the first and second precise time references can be received concurrently or sequentially. For example, the first precise time reference can be obtained during UE usage of the first cell, and then held by the UE for a validity period, which may depend on the precision of the UE's clock and hence its capability to keep precise time.

The method includes, at operation 1240, deriving, by the UE, a second uplink timing adjustment that establishes uplink synchronization with the second cell, the second uplink timing adjustment derived from the first and second precise time references and the first uplink timing adjustment.

Figure 13:
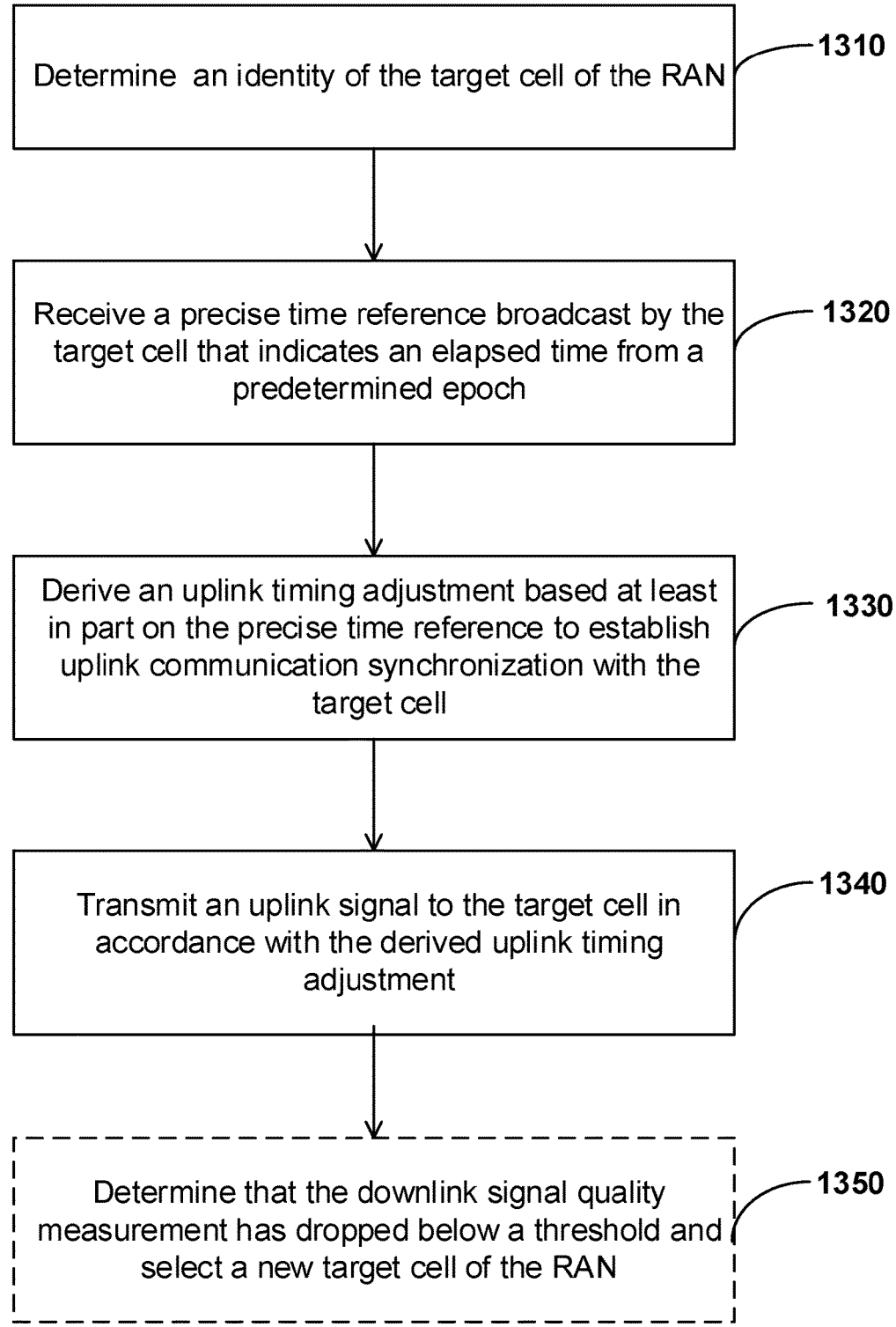
FIG. 13 illustrates, in one embodiment, a method of operation performed in a user equipment (UE), for autonomous handover from a source cell to a target cell of a radio access network (RAN).

FIG. 13 illustrates, in one embodiment, a method 1300 performed by a user equipment (UE), such as UE 310, for autonomous handover from a source cell to a target cell of a radio access network (RAN). The method 1300 may be carried out by software executed, for example, by the processor 1005 of the UE 310 (i.e., when the UE 310 is an ED 1000). The software may include machine readable instructions which are executable by the processor 1005 to perform the method 1300. The machine readable instructions of the software may be stored in a non-transitory machine readable medium, such as the memory 1015 of the UE 310. Coding of software for carrying out the method 1300 is within the scope of a person of ordinary skill in the art provided the present disclosure. The method 1300 may contain additional or fewer operations than shown and/or described, and may be performed in a different order.

The method 1300 begins at operation 1310. At operation 1310, the UE 310 determine an identity of a target cell of a RAN. In some embodiments, the identity of the target cell is determined by the UE based on downlink signal measurements performed by the UE 310. In some embodiments, the downlink signal measurements includes a downlink signal quality measurement. After the identity of the target cell is determined at operation 1310, the method 1300 proceeds to operation 1320. At operation 1320, the UE 310 receives a precise time reference broadcast by a target cell in the RAN that indicates an elapsed time from a pre-determined epoch. In some embodiments, the precise time reference is broadcast by the target cell in a system information block (SIB).

After the UE 310 receives a precise time reference at operation 1320, the method 1300 proceeds to operation 1330. At operation 1330, the UE 310 derives an uplink timing adjustment based on the precise time reference, where the uplink timing adjustment establishing uplink communication synchronization with the target cell of the RAN. In some embodiments, the UE 310 derives uplink timing adjustment further based on a timing adjustment message transmitted to the UE from the source cell. After the UE 310 derives an uplink timing adjustment at operation 1330, the method 1300 proceeds to operation 1340. At operation 1340, the UE 310 transmits an uplink signal to the target cell in accordance with the derived uplink timing adjustment, and the method 1300 ends.

In some embodiments, after the UE 310 transmits an uplink signal to the target cell at operation 1340, the method 1300 proceeds to operation 1350. At operation 1350, the UE 310 determines that the downlink signal quality measurement has dropped below a pre-established signal quality threshold and the UE 310 selects a new target cell of the RAN. After the UE 310 selects a new target cell at operation 1350, the method 1300 resumes at operation 1320.

Figure 14:
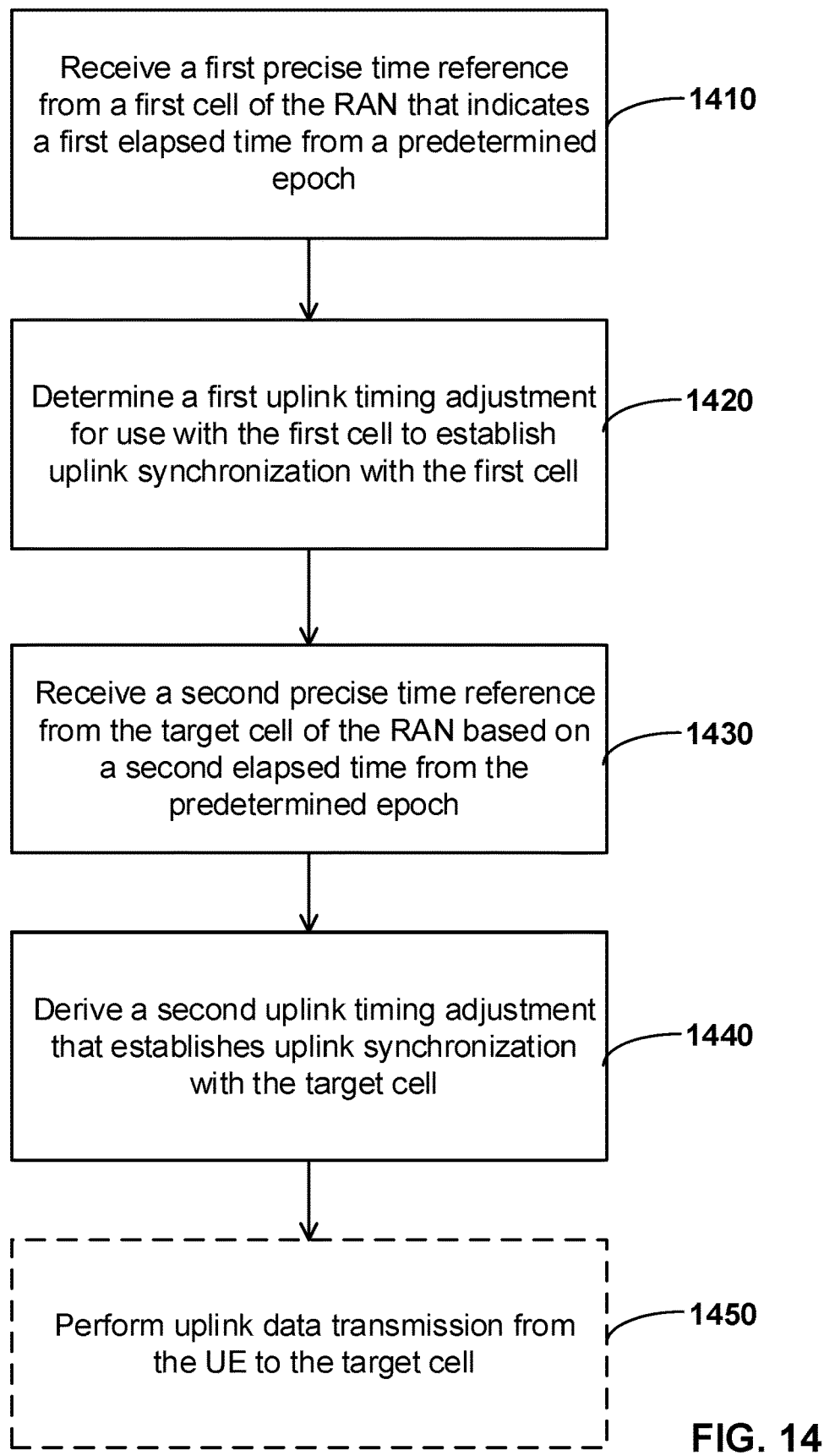
FIG. 14 illustrates, in one embodiment, a method of operation performed in a user equipment (UE), for autonomous synchronisation within a radio access network (RAN).

FIG. 14 illustrates, in one embodiment, a method 1440 performed by a user equipment (UE), such as UE 310, for autonomous synchronisation within a radio access network (RAN). The method 1400 may be carried out by software executed, for example, by the processor 1005 of the UE 310 (i.e., when the UE 310 is an ED 1000). The software may include machine readable instructions which are executable by the processor 1005 to perform the method 1400. The machine readable instructions of the software may be stored in a non-transitory machine readable medium, such as the memory 1015 of the UE 310. Coding of software for carrying out the method 1400 is within the scope of a person of ordinary skill in the art provided the present disclosure.

The method 1400 may contain additional or fewer operations than shown and/or described, and may be performed in a different order.

The method 1400 begins at operation 1410. At operation 1410, the UE 310 receives a first precise time reference from a first cell of the RAN that indicates a first elapsed time from a predetermined epoch. After the UE 310 receives a first precise time reference at operation 1410, the method 1400 proceeds to operation 1420. In some embodiments, the first precise time reference is received in a broadcast in a system information block (SIB) broadcast, or a radio resource control (RRC) message. At operation 1420, the UE 310 determines a first uplink timing adjustment for use with the first cell to establish uplink synchronization with the first cell. In some embodiments, the first uplink timing adjustment is determined by the UE 310 based on a timing adjustment message transmitted to the UE 310 from the first cell. After the UE 310 determines the first uplink timing adjustment at operation 1420, the method 1400 proceeds to operation 1430. At operation 1430, the UE 310 receives a second precise timing reference from the target cell of the RAN based on a second elapsed time form the predetermined epoch. In some embodiments, the second precise timing reference is received in an SIB broadcast. After the UE 310 receives a second precise timing reference at operation 1430, the method 1400 proceeds to operation 1440. At operation 1440, the UE 310 derives a second uplink timing adjustment that establishes uplink synchronization with the target cell of the RAN. After the UE 310 derives a second uplink timing adjustment, the method 1400 ends.

In some embodiments, the UE 310 derives the second uplink timing adjustment by synchronizing a local clock of the UE to the first precise time reference using the first uplink timing adjustment, and by determining the second uplink timing adjustment based on the difference between the local clock and the second precise time reference.

In some embodiments, after the UE 310 derives a second uplink timing adjustment, the method 1400 proceeds to operation 1450. At operation 1450, the UE 310 performs uplink data transmission to the target cell with the uplink data transmission advanced according to the second uplink timing adjustment. After the UE 310 performs the uplink data transmission, the method 1400 ends. In some embodiments, the uplink data transmission includes an identifier assigned to the UE 310 for use in the target cell of the RAN. The identifier assigned to the UE may be used to identify the UE in subsequent messages transmitted by the target cell. In some embodiments, the subsequent messages include downlink control information (DCI) transmitted over a physical downlink control channel (PDCCH).

The above-described operations may be performed by one or more functional modules of a UE 310. As mentioned above, the UE 310 may be an ED 1000, which includes at least a processor 1005, network interface 1010 and memory 1015, operating in concert to perform any of the above-described operations. The functional modules may also perform other operations, such as conventional transmission and reception operations. The modules may be enabled by a processor 1005 executing program instructions stored in memory 1015, by particular electronic digital and/or analog circuitry, or a combination thereof. For example, referring again to FIG. 10, the ED 1000 may include an autonomous cell targeter 1020 configured to determine a target cell with which to communicate, and a timing adjuster 1030 configured to derive uplink timing adjustments for communication with the target cell. The timing adjuster 1030 can be configured to receive precise time references, obtain prior stored timing adjustments for previously accessed cells, and derive new timing adjustments for accessing new target cells.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method, performed by a user equipment (UE), for autonomous uplink synchronization with a target cell in a radio access network (RAN), the method comprising:
   receiving, at the UE, a first precise time reference from a first cell of the RAN, the first precise time reference indicating a first elapsed time from a predetermined epoch;
   determining a first uplink timing adjustment for use with the first cell, the first uplink timing adjustment for establishing uplink synchronization with the first cell;
   receiving, at the UE, a second precise time reference from the target cell of the RAN, the second precise time reference indicating a second elapsed time from the predetermined epoch; and
   deriving, by the UE, a second uplink timing adjustment that establishes uplink synchronization with the target cell, the second uplink timing adjustment derived from the first and second precise time references and the first uplink timing adjustment.

2. The method of claim 1, wherein the first uplink timing adjustment is determined by the UE based on a timing adjustment message transmitted to the UE from the first cell.

3. The method of claim 1, wherein deriving the second uplink timing adjustment comprises:
   synchronizing a local clock of the UE to the first precise time reference using the first uplink timing adjustment; and
   determining the second uplink timing adjustment based on the difference between the local clock and the second precise time reference.

4. The method of claim 1, further comprising performing an uplink data transmission from the UE to the target cell with the uplink data transmission advanced according to the second uplink timing adjustment.

5. The method of claim 4, wherein the uplink data transmission includes an identifier assigned to the UE for use in the target cell.

6. The method of claim 5, wherein the identifier assigned to the UE is used to identify the UE in subsequent messages transmitted by the target cell.

7. The method of claim 6, wherein the subsequent messages include downlink control information (DCI) transmitted over a physical downlink control channel (PDCCH).

8. The method of claim 1 wherein the first precise time reference is received in at least one of a system information block (SIB) broadcast, and a radio resource control (RRC) message, and the second precise time reference is received in a SIB broadcast.

9. A user equipment (UE) comprising:
a radio network interface for receiving and transmitting signals over a radio link;
a processor;
a local clock; and
a memory device storing instructions that when executed by the processor cause the UE to:
receive, using the radio network interface, a first precise time reference from a first cell of a radio access network (RAN), the first precise time reference indicating a first elapsed time from a predetermined epoch;
determine a first uplink timing adjustment for use with the first cell, the first uplink timing adjustment for establishing uplink synchronization with the first cell;
receive, using the radio network interface, a second precise time reference from a target cell of the RAN, the second precise time reference indicating a second elapsed time from the predetermined epoch; and
derive a second uplink timing adjustment that establishes uplink synchronization with the target cell, the second uplink timing adjustment derived from the first and second precise time references and the first uplink timing adjustment.

10. The UE of claim 9, wherein the first uplink timing adjustment is determined by the UE based at least in part on a timing adjustment message transmitted to the UE from the first cell.

11. The UE of claim 9, further comprising instructions executable to derive the second uplink timing adjustment by:
synchronizing the local clock to the first precise time reference using the first uplink timing adjustment; and
determining the second uplink timing adjustment based on the difference between the local clock and the second precise time reference.

12. The UE of claim 9, further comprising instructions executable to perform an uplink data transmission, using the radio network interface, from the UE to the target cell with the uplink data transmission advanced according to the second uplink timing adjustment.

13. The UE of claim 12, wherein the uplink data transmission includes an identifier assigned to the UE for use in the target cell.

14. The UE of claim 9, wherein the first precise time reference is received in at least one of a system information block (SIB) broadcast, and a radio resource control (RRC) message and the second precise time reference is received in a SIB broadcast.

* * * * *

UNITED STATES PATENT AND TRADEMARK OFFICE
CERTIFICATE OF CORRECTION

PATENT NO. : 11,197,254 B2
APPLICATION NO. : 16/664442
DATED : December 7, 2021
INVENTOR(S) : William Anthony Gage Page 1 of 1

It is certified that error appears in the above-identified patent and that said Letters Patent is hereby corrected as shown below:

In the Specification

In the Description
Column 13, Line 33, "320 (e.g. for hybrid automatic repeat request (HARD) and" should be --320 (e.g. for hybrid automatic repeat request (HARO) and--

Signed and Sealed this
Sixth Day of September, 2022

Katherine Kelly Vidal
*Director of the United States Patent and Trademark Office*